(12) United States Patent
Dalal et al.

(10) Patent No.: US 9,286,472 B2
(45) Date of Patent: *Mar. 15, 2016

(54) EFFICIENT PACKET HANDLING, REDIRECTION, AND INSPECTION USING OFFLOAD PROCESSORS

(71) Applicant: Xockets, Inc., San Jose, CA (US)

(72) Inventors: Parin Bhadrik Dalal, Milpitas, CA (US); Stephen Paul Belair, Santa Cruz, CA (US)

(73) Assignee: Xockets, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/900,359

(22) Filed: May 22, 2013

(65) Prior Publication Data

US 2014/0157397 A1 Jun. 5, 2014

Related U.S. Application Data

(60) Provisional application No. 61/650,373, filed on May 22, 2012, provisional application No. 61/753,892, filed on Jan. 17, 2013, provisional application No. 61/753,895, filed on Jan. 17, 2013, provisional (Continued)

(51) Int. Cl.
*H04L 29/06* (2006.01)
*G06F 21/55* (2013.01)
*G06F 13/16* (2006.01)

(Continued)

(52) U.S. Cl.
CPC ............ *G06F 21/55* (2013.01); *G06F 13/1605* (2013.01); *G06F 13/1652* (2013.01); *G06F 13/28* (2013.01); *H04L 29/06* (2013.01); *H04L 47/10* (2013.01); *H04L 63/0227* (2013.01)

(58) Field of Classification Search
CPC ................................. H04L 47/10; H04L 29/06
USPC ........................................................... 726/13
See application file for complete search history.

(56) References Cited

U.S. PATENT DOCUMENTS

| 5,237,662 A | 8/1993 | Green et al. |
| 5,247,675 A | 9/1993 | Farrell et al. |
| 5,446,844 A * | 8/1995 | Steckler ................. G06F 13/18 711/118 |

(Continued)

FOREIGN PATENT DOCUMENTS

| WO | 2011120019 A2 | 9/2011 |
| WO | 2012141694 A1 | 10/2012 |

OTHER PUBLICATIONS

Senapathi et al., Introduction to TCP offload Engines, Mar. 2004, Dell, pp. 103-107.*

(Continued)

*Primary Examiner* — Dao Ho

(57) ABSTRACT

A packet handling system is disclosed that can include at least one main processor, a plurality of offload processors connected to a memory bus and configured to provide security related services on packets prior to redirection to the main processor; an arbiter connected to each of the plurality of offload processors, the arbiter capable of scheduling resource priority for instructions or data received from the memory bus; and a virtual switch respectively connected to the main processor and the plurality of offload processors using the memory bus, with the virtual switch capable of receiving memory read/write data over the memory bus, and further directing at least some memory read/write data to the arbiter.

8 Claims, 10 Drawing Sheets

Related U.S. Application Data application No. 61/753,899, filed on Jan. 17, 2013, provisional application No. 61/753,901, filed on Jan. 17, 2013, provisional application No. 61/753,903, filed on Jan. 17, 2013, provisional application No. 61/753,904, filed on Jan. 17, 2013, provisional application No. 61/753,906, filed on Jan. 17, 2013, provisional application No. 61/753,907, filed on Jan. 17, 2013, provisional application No. 61/753,910, filed on Jan. 17, 2013.

(51) Int. Cl.
*H04L 12/801* (2013.01)
*G06F 13/28* (2006.01)

(56) References Cited

U.S. PATENT DOCUMENTS

| | | | |
|---|---|---|---|
| 5,577,213 A | 11/1996 | Avery et al. | |
| 5,870,350 A | 2/1999 | Bertin et al. | |
| 6,092,146 A | 7/2000 | Dell et al. | |
| 6,157,955 A * | 12/2000 | Narad | H04L 45/16 709/228 |
| 6,330,658 B1 | 12/2001 | Evoy et al. | |
| 6,751,113 B2 | 6/2004 | Bhakta et al. | |
| 6,810,442 B1 | 10/2004 | Lin et al. | |
| 6,873,534 B2 | 3/2005 | Bhakta et al. | |
| 6,877,076 B1 | 4/2005 | Cho et al. | |
| 6,930,900 B2 | 8/2005 | Bhakta et al. | |
| 6,930,903 B2 | 8/2005 | Bhakta et al. | |
| 7,062,618 B2 | 6/2006 | Tsunoda et al. | |
| 7,089,412 B2 | 8/2006 | Chen et al. | |
| 7,254,036 B2 | 8/2007 | Pauley et al. | |
| 7,286,436 B2 | 10/2007 | Bhakta et al. | |
| 7,289,386 B2 | 10/2007 | Bhakta et al. | |
| 7,305,574 B2 | 12/2007 | Ferraiolo et al. | |
| 7,375,970 B2 | 5/2008 | Pauley et al. | |
| 7,421,552 B2 | 9/2008 | Long | |
| 7,442,050 B1 | 10/2008 | Bhakta et al. | |
| 7,454,749 B2 | 11/2008 | Oberdorfer | |
| 7,467,251 B2 | 12/2008 | Park et al. | |
| 7,472,205 B2 | 12/2008 | Abe | |
| 7,480,611 B2 | 1/2009 | Gooding et al. | |
| 7,532,537 B2 | 5/2009 | Solomon et al. | |
| 7,619,893 B1 | 11/2009 | Yu | |
| 7,619,912 B2 | 11/2009 | Bhakta et al. | |
| 7,636,274 B2 | 12/2009 | Solomon et al. | |
| 7,716,035 B2 | 5/2010 | Oshins et al. | |
| 7,716,411 B2 | 5/2010 | Panabaker et al. | |
| 7,811,097 B1 | 10/2010 | Bhakta et al. | |
| 7,839,645 B2 | 11/2010 | Pauley et al. | |
| 7,840,748 B2 | 11/2010 | Gower et al. | |
| 7,864,627 B2 | 1/2011 | Bhakta et al. | |
| 7,881,150 B2 | 2/2011 | Solomon et al. | |
| 7,904,688 B1 | 3/2011 | Kuo et al. | |
| 7,916,574 B1 | 3/2011 | Solomon et al. | |
| 8,001,434 B1 | 8/2011 | Lee et al. | |
| 8,033,836 B1 | 10/2011 | Bhakta et al. | |
| 8,054,832 B1 | 11/2011 | Shukla et al. | |
| 8,072,837 B1 | 12/2011 | Solomon et al. | |
| 8,081,535 B2 | 12/2011 | Bhakta et al. | |
| 8,081,536 B1 | 12/2011 | Solomon et al. | |
| 8,081,537 B1 | 12/2011 | Bhakta et al. | |
| 8,117,369 B2 | 2/2012 | Nishtala et al. | |
| 8,154,901 B1 | 4/2012 | Lee et al. | |
| 8,190,699 B2 | 5/2012 | Mcmillian et al. | |
| 8,264,903 B1 | 9/2012 | Lee et al. | |
| 8,287,291 B1 | 10/2012 | Bhakta et al. | |
| 8,301,833 B1 | 10/2012 | Chen et al. | |
| 8,347,005 B2 | 1/2013 | Bresniker | |
| 8,359,501 B1 | 1/2013 | Lee et al. | |
| 8,417,870 B2 | 4/2013 | Lee et al. | |
| 8,489,837 B1 | 7/2013 | Lee | |
| 8,516,185 B2 | 8/2013 | Lee et al. | |
| 8,516,187 B2 | 8/2013 | Chen et al. | |
| 8,516,188 B1 | 8/2013 | Solomon et al. | |
| 8,553,470 B2 | 10/2013 | Lee et al. | |
| 8,555,002 B2 | 10/2013 | Karamcheti et al. | |
| 8,599,634 B1 | 12/2013 | Lee et al. | |
| 8,631,193 B2 | 1/2014 | Smith et al. | |
| 8,656,072 B2 | 2/2014 | Hinkle et al. | |
| 8,689,064 B1 | 4/2014 | Lee et al. | |
| 8,756,364 B1 | 6/2014 | Bhakta et al. | |
| 8,775,858 B2 | 7/2014 | Gower et al. | |
| 8,782,350 B2 | 7/2014 | Lee et al. | |
| 8,782,373 B2 | 7/2014 | Karamcheti et al. | |
| 8,787,060 B2 | 7/2014 | Lee | |
| 8,864,500 B1 | 10/2014 | Bhakta et al. | |
| 8,868,829 B2 | 10/2014 | Rajan et al. | |
| 8,874,831 B2 | 10/2014 | Lee et al. | |
| 8,874,843 B2 | 10/2014 | Okin et al. | |
| 8,881,389 B2 | 11/2014 | Kanapathippillai et al. | |
| 8,904,098 B2 | 12/2014 | Amidi et al. | |
| 8,924,680 B2 | 12/2014 | Perego et al. | |
| 8,930,647 B1 | 1/2015 | Smith | |
| 8,943,245 B2 | 1/2015 | Karamcheti et al. | |
| 2002/0181450 A1 | 12/2002 | Sokol et al. | |
| 2004/0093477 A1 | 5/2004 | Oberdorfer | |
| 2004/0148420 A1 | 7/2004 | Hinshaw et al. | |
| 2004/0202319 A1 * | 10/2004 | Hussain | H04L 63/0428 380/33 |
| 2005/0018495 A1 | 1/2005 | Bhakta et al. | |
| 2005/0120160 A1 | 6/2005 | Plouffe et al. | |
| 2005/0226238 A1 | 10/2005 | Hoskote et al. | |
| 2005/0240745 A1 | 10/2005 | Iyer et al. | |
| 2006/0004965 A1 | 1/2006 | Tu et al. | |
| 2007/0079185 A1 * | 4/2007 | Totolos, Jr. | G06F 11/106 714/718 |
| 2007/0124532 A1 | 5/2007 | Bennett et al. | |
| 2007/0226745 A1 | 9/2007 | Haas et al. | |
| 2007/0299990 A1 | 12/2007 | Ben-yehuda et al. | |
| 2008/0040551 A1 | 2/2008 | Gray et al. | |
| 2008/0229049 A1 | 9/2008 | Nanda et al. | |
| 2008/0259555 A1 | 10/2008 | Bechtolsheim et al. | |
| 2008/0304481 A1 * | 12/2008 | Gurney | H04L 69/16 370/389 |
| 2009/0138440 A1 * | 5/2009 | Goyal | G06F 17/30985 |
| 2009/0187713 A1 | 7/2009 | Zedlewski et al. | |
| 2009/0201711 A1 | 8/2009 | Solomon et al. | |
| 2010/0091540 A1 | 4/2010 | Bhakta et al. | |
| 2010/0110642 A1 | 5/2010 | Pauley et al. | |
| 2010/0128507 A1 | 5/2010 | Solomon et al. | |
| 2010/0183033 A1 | 7/2010 | Hannuksela | |
| 2011/0016250 A1 | 1/2011 | Lee et al. | |
| 2011/0022818 A1 | 1/2011 | Kegel et al. | |
| 2011/0085406 A1 | 4/2011 | Solomon et al. | |
| 2011/0090749 A1 | 4/2011 | Bhakta et al. | |
| 2011/0099317 A1 | 4/2011 | Nishtala et al. | |
| 2011/0110376 A1 | 5/2011 | Jiang | |
| 2011/0154318 A1 | 6/2011 | Oshins et al. | |
| 2011/0202679 A1 | 8/2011 | Cohen et al. | |
| 2011/0211444 A1 | 9/2011 | Das et al. | |
| 2011/0235260 A1 | 9/2011 | Lee et al. | |
| 2011/0296440 A1 | 12/2011 | Laurich et al. | |
| 2012/0027018 A1 | 2/2012 | Ilyadis | |
| 2012/0047126 A1 | 2/2012 | Branscome et al. | |
| 2012/0079209 A1 | 3/2012 | Zhou et al. | |
| 2012/0079352 A1 | 3/2012 | Frost et al. | |
| 2012/0106228 A1 | 5/2012 | Lee | |
| 2012/0239874 A1 | 9/2012 | Lee et al. | |
| 2012/0250386 A1 | 10/2012 | Lee et al. | |
| 2012/0250682 A1 | 10/2012 | Vincent et al. | |
| 2012/0271990 A1 | 10/2012 | Chen et al. | |
| 2012/0331268 A1 | 12/2012 | Konig et al. | |
| 2013/0003556 A1 | 1/2013 | Boden et al. | |
| 2013/0019057 A1 | 1/2013 | Stephens et al. | |
| 2013/0019076 A1 | 1/2013 | Amidi et al. | |
| 2013/0039128 A1 | 2/2013 | Amidi et al. | |
| 2013/0086309 A1 | 4/2013 | Lee et al. | |
| 2013/0132639 A1 | 5/2013 | Amidi et al. | |
| 2013/0219168 A1 * | 8/2013 | Gearhart et al. | 713/153 |
| 2013/0262739 A1 | 10/2013 | Bennett et al. | |
| 2014/0040568 A1 | 2/2014 | Lee et al. | |

(56) References Cited

U.S. PATENT DOCUMENTS

| | | |
|---|---|---|
| 2014/0040569 A1 | 2/2014 | Solomon et al. |
| 2014/0075106 A1 | 3/2014 | Okin et al. |
| 2014/0281661 A1 | 9/2014 | Milton et al. |
| 2014/0337539 A1 | 11/2014 | Lee et al. |
| 2015/0070959 A1 | 3/2015 | Lee |

OTHER PUBLICATIONS

Microsoft, Overview of Single Root I/O Virtualization, Sep. 2012, Microsoft, p. 1.*
PCT International Search Report for International Application PCT/US2013/047205, dated Sep. 24, 2013.
PCT Written Opinion of the International Search Authority for International Application PCT/US2013/047205, dated Sep. 24, 2013.
PCT International Search Report for International Application PCT/US2013/047217, dated Jan. 29, 2014.
PCT Written Opinion of the International Search Authority for International Application PCT/US2013/047217, dated Jan. 29, 2014.
PCT International Search Report for International Application PCT/US2013/046417, dated Dec. 23, 2013.
PCT Written Opinion of the International Search Authority for International Application PCT/US2013/046417, dated Dec. 23, 2013.
PCT International Search Report for International Application PCT/US2013/044856, dated Feb. 10, 2014.
PCT Written Opinion of the International Search Authority for International Application PCT/US2013/044856, dated Feb. 10, 2014.
PCT International Search Report for International Application PCT/US2013/044857, dated Feb. 10, 2014.
PCT Written Opinion of the International Search Authority for International Application PCT/US2013/044857, dated Feb. 10, 2014.
PCT International Search Report for International Application PCT/US2013/048013, dated Jan. 17, 2014.
PCT Written Opinion of the International Search Authority for International Application PCT/US2013/048013, dated Jan. 17, 2014.
PCT International Search Report for International Application PCT/US2013/042284, dated Nov. 26, 2013.
PCT Written Opinion of the International Search Authority for International Application PCT/US2013/042284, dated Nov. 26, 2013.
PCT International Search Report for International Application PCT/US2013/042279, dated Jan. 22, 2014.
PCT Written Opinion of the International Search Authority for International Application PCT/US2013/042279, dated Jan. 22, 2014.
PCT International Search Report for International Application PCT/US2013/042274, dated Dec. 6, 2013.
PCT Written Opinion of the International Search Authority for International Application PCT/US2013/042274, dated Dec. 6, 2013.
Office Action, dated Jan. 29, 2015, for U.S. Appl. No. 13/900,351, filed May 22, 2013.
Office Action, dated May 4, 2015, for U.S. Appl. No. 13/900,346, filed May 22, 2013.
Office Action, dated May 22, 2015, for U.S. Appl. No. 13/900,367, filed May 22, 2013.

* cited by examiner

| Systems | x86 | ARM | DIMMs | NICs |
|---|---|---|---|---|
| Xockets MAX 1U | 2x Opteron 4256 EE, 1.8GhZ/8MB | 80x A9, 800MHz, 1MB | 8 x 8GB | 4 x 40 Gbps |
| Xockets MIN 1U | 2x Opteron 4256 EE, 1.8GhZ/8MB | 20x A9, 800MHz, 1MB | 14 x 8GB | 2 x 10 Gbps |
| Reference 1U | 2x Xeon E31280, 3.3GhZ/8MB | | 18 x 8GB | 2 x 10 Gbps |
| Xockets MAX 2U | 4x Opteron 4256 EE, 1.8GhZ/8MB | 160x A9, 800MHz, 1MB | 16 x 8GB | 4 x 80 Gbps |
| Reference 2U | 4x Xeon E31280, 3.3GhZ/8MB | | 32 x 8GB | 4 x 20 Gbps |

FIG. 4-3

| Component | Av. Power (W) | Max. Power (W) | Qty. | Av. Total (W) | Total (W) |
|---|---|---|---|---|---|
| RLDRAM3, 667 MHz 576MB | 0.7 | 1.2 | 4 | 2.8 | 4.8 |
| Zynq 7020 800 MHz | 1.5 | 2.5 | 4 | 6 | 10 |
| Zynq 7020 800 MHz (arb) | 1.3 | 2.1 | 1 | 1.3 | 2.1 |
| Inphi iMB2 | 0.8 | 1.2 | 1 | 0.8 | 2.9 |
| Other | | | | 2.9 | 2.1 |
| Total Power Budget at maximum 24 Gbps ingress and 24 Gbps egress per DIMM | | | | 13.8 | 21 |

FIG. 4-4

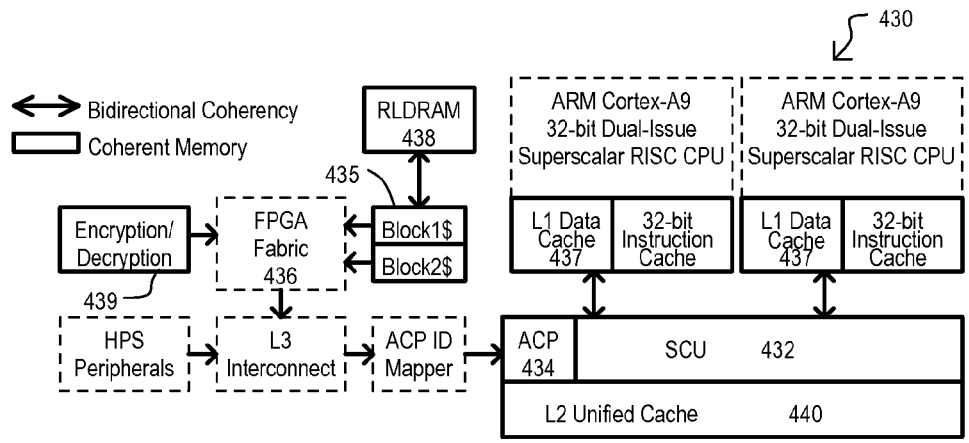

FIG. 4-5

EFFICIENT PACKET HANDLING, REDIRECTION, AND INSPECTION USING OFFLOAD PROCESSORS

PRIORITY CLAIMS

This application claims the benefit of U.S. Provisional Patent Applications 61/650,373 filed May 22, 2012, 61/753,892 filed on Jan. 17, 2013, 61/753,895 filed on Jan. 17, 2013, 61/753,899 filed on Jan. 17, 2013, 61/753,901 filed on Jan. 17, 2013, 61/753,903 filed on Jan. 17, 2013, 61/753,904 filed on Jan. 17, 2013, 61/753,906 filed on Jan. 17, 2013, 61/753,907 filed on Jan. 17, 2013, and 61/753,910 filed on Jan. 17, 2013, the contents all of which are incorporated by reference herein.

TECHNICAL FIELD

The present disclosure relates generally to servers capable of efficiently handling routine packet inspection or other tasks without direction from a main processor. More particularly, systems supporting offload or auxiliary processing modules that can be physically connected to a system memory bus to process packet data independent of a host processor of the server are described.

BACKGROUND

Packet handling and security applications can require a significant amount of scarce computational resources in enterprise server or cloud based data systems. These can include services such as packet repeaters, intrusion detection systems (IDS), intrusion protection systems (IPS), and routing mechanisms for virtual private networks (VPNs). Many proprietary and incompatible hardware systems are available for such packet handling and transport services, but cost and a desire for standardization pushes enterprise data storage and processing providers toward software defined stacks running on commodity (e.g., x86 architecture) hardware.

Unfortunately, processors based on x86 architectures are ill-equipped to handle such high volume applications. Even idling, x86 processors use a significant amount of power, and near continuous operation for high bandwidth packet analysis functionality make the processor energy costs one of the dominate price factors. In addition, issues with the high cost of context switching, the limited parallelism, and the security implications associated with running encryption/decryption modules on x86 processors have reduced the effectiveness of enterprise or cloud data security.

SUMMARY

A packet handling system can include at least one main processor, a plurality of offload processors connected to a memory bus and configured to provide security related services on packets prior to redirection to the main processor; an arbiter connected to each of the plurality of offload processors, the arbiter capable of scheduling resource priority for instructions or data received from the memory bus; and a virtual switch respectively connected to the main processor and the plurality of offload processors using the memory bus, with the virtual switch capable of receiving memory read/write data over the memory bus, and further directing at least some memory read/write data to the arbiter.

BRIEF DESCRIPTION OF THE DRAWINGS

FIG. 3-1 illustrates an embodiment with software stacks respectively running on a XIMM module and an x86-based server processor.

FIG. 3-2 illustrates an embodiment with software stacks described in FIG. 3-1 operating in the context of two servers communicating over an Ethernet-type connection FIG. 4-1 shows a cartoon schematically illustrating a data processing system according to an embodiment, including a removable computation module for offload of data processing.

FIG. 4-2 shows an example layout of a XIMM module according to an embodiment.

FIG. 4-3 shows two possible architectures for a XIMM module in a simulation (Xockets MAX and MIN).

FIG. 4-4 shows a representative the power budget for an example of a Xockets XIMM.

FIG. 4-5 illustrates data flow operations of one embodiment using an ARM A9 architecture according to an embodiment.

FIG. 5-1 is a block schematic diagram of a processing module according to an embodiment.

FIGS. 5-2 and 5-3 are diagrams of a processor module according to embodiments.

FIG. 5-4 is a diagram showing an opposing side of a processor module like that of FIG. 5-2 or 5-3, according to an embodiment.

FIG. 5-5 is a diagram of a system according to an embodiment.

FIGS. 5-6 to 5-11 are block schematic diagrams showing processor module operations according to particular embodiments.

FIG. 5-12 is a flow diagram of a method according to an embodiment.

FIG. 5-13 is a flow diagram of a method according to another embodiment.

FIG. 6-1 is a block schematic diagram of a system according to another embodiment.

FIG. 6-2 is a diagram showing a system flow according to an embodiment.

DETAILED DESCRIPTION

Packet handling and security applications for enterprise server or cloud based data systems can be efficiently implemented on offload processing modules connected to a memory bus, for example, by insertion into a socket for a Dual In-line Memory Module (DIMM). Such modules can be referred to as Xocket™ In-line Memory Modules (XIMMs), and can have multiple "wimpy" cores associated with a memory channel. Using one or more XIMMs it is possible to execute lightweight packet handling tasks without intervention from a main server processor. As will be discussed, XIMM modules can have high efficiency context switching, high parallelism, and can solve security problems associated with running encryption/decryption modules on x86 processors. Such systems as a whole are able to handle high network bandwidth traffic at a lower latency and at a very low power when compared to traditional high power 'brawny' server cores. XIMMs can provide services such as firewall packet repeaters, intrusion detection systems (IDS), intrusion protection systems (IPS), and routing mechanisms for virtual private networks with low power costs and high reliability.

Figure 1:
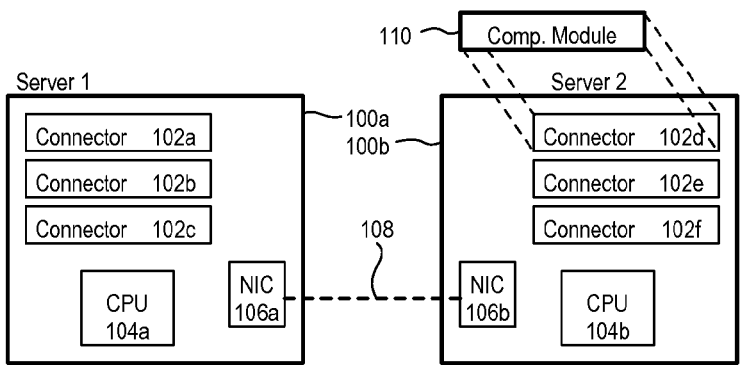
FIG. 1 shows an embodiment with two computers which can be rack servers connected over a network interface such as an Ethernet-type interface.

FIG. 1 illustrates an embodiment with two computers which can be rack servers (100*a*, 100*b*) connected over a network interface such as Ethernet (108). It is seen that both contain a central processing unit (104a, 104b), a network interface controller (106a, 106b) and a number of connectors (102a, 102b, 102c, 102d, 102e, 102f) which can be dual-inline memory module (DIMM) connectors. It is further seen that the second server (100b) has a removable computation module (110) which can be inserted into one of the connector slots (102d). In an example, this computation module is a XIMM. Packets can be sent bi-directionally between the two servers, through the shown NICs and over the connection (108), and a variety of offload packet handling services can be performed by the XIMM in the second server, including but not limited to virtual private network (VPN) tunneling and signature detection and packet filtering as an intrusion prevention system (IPS).

Figure 2:
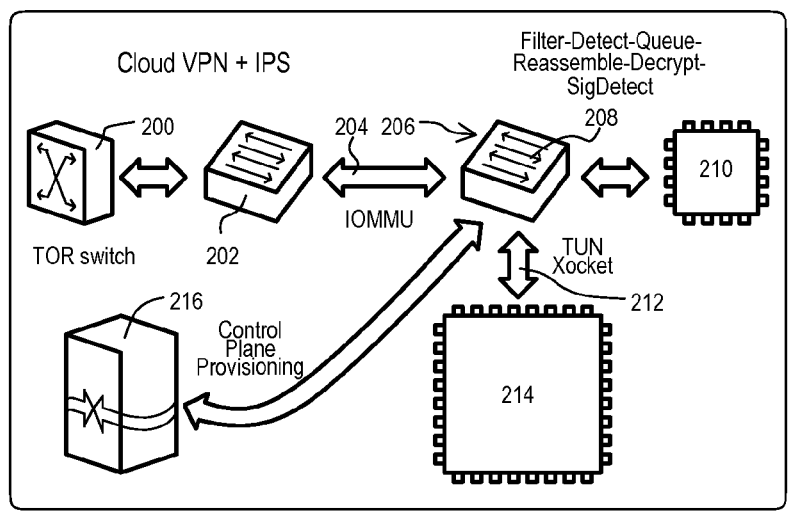
FIG. 2 shows module according to an embodiment (referred to as a XIMM module) in more detail acting as a part of the second server.

FIG. 2 shows a different view of the XIMM module in the context of the second server shown above in FIG. 1. Network packets flow from a top-of-rack (TOR) switch (200) to the server, where a first virtual switch (202), in this case a network interface card with single root IO virtualization (SR-IOV), receives the packets and determines which XIMM module (206) to send them to. The packet is passed to the XIMM by way of an input-out memory management unit (IOMMU 204). On the XIMM 206, a first of a number of offload processors can act as a virtual switch (208).

The virtual switch 208 can be created with virtual switching software such as OpenFlow. OpenFlow is an open standard network protocol used to manage traffic between commercial Ethernet switches, routers and wireless access points. OpenFlow enables software-defined networking (SDN) for programmable networks and typically emulates a hardware Ethernet switch. Using a configurable data flow table it is possible to connect multiple switches and/or networks together to create a data flow, and then flexibly managing the entire infrastructure, setting policies and managing traffic type as needed. It allows for deployment of innovative routing and switching protocols in a network for many different applications, including virtual machine and high-security networks. The software stack running on a processor of the server also provides control plane provisioning (216) which includes a variety of packet handling services including but not limited to virtual private network (VPN) encryption/decryption through an open source technology such as OpenVPN, as but one example. Upon receipt, a decrypted packet is arbitrated by said processor acting as a switch to a second of a plurality of other offload processors (210). The second offload processor 210 can be running an operating system such as Apache, and may utilize a software stack for packet handling services. It reassembles decrypted packet data and performs intrusion prevention systems (IPS) signature detection in order to detect malicious incoming packet traffic. Optionally, a connection can also be established between the XIMM 206 and another server processor (e.g., a x86 processor) (214) through a high speed bus. Packets may be sent to the x86 processor 214 via a bus, including but limited to memory busses such as a double data rate (DDR, DDR2, DDR3, DDR4) bus. In this example, an Ethernet tunnel (212) exists over a DDR bus between the XIMM and the server's x86 processor (214) for the transmission of packets or other information between the two.

Advantageously, such a system can greatly improve computational and power efficiency for management of simultaneously running IPS and VPN services. Traditionally, IPS protocols require the assembly of data for signature detection before traffic is allowed to access a server, but VPN protocols mandate decryption on the server to produce signature detection data. In practice, many cloud service providers are forced to use proprietary hardware or simply disallow IPS services to a server core (limiting IPS to between an enterprise router and a gateway). Use of XIMMs allows the problems associated with simultaneous IPS and VPN to be avoided, since signature detection can occur on the XIMM (for example, with the aid of Advanced Encryption Standard (AES) cores implementable on FPGA cores in a XIMM), while VPN interconnection is maintained.

Figures 1, 3:
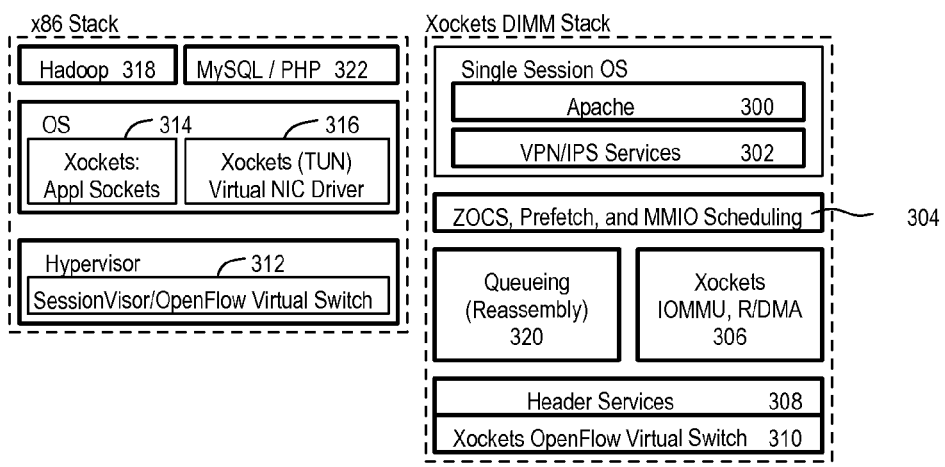
Figures 2, 3:
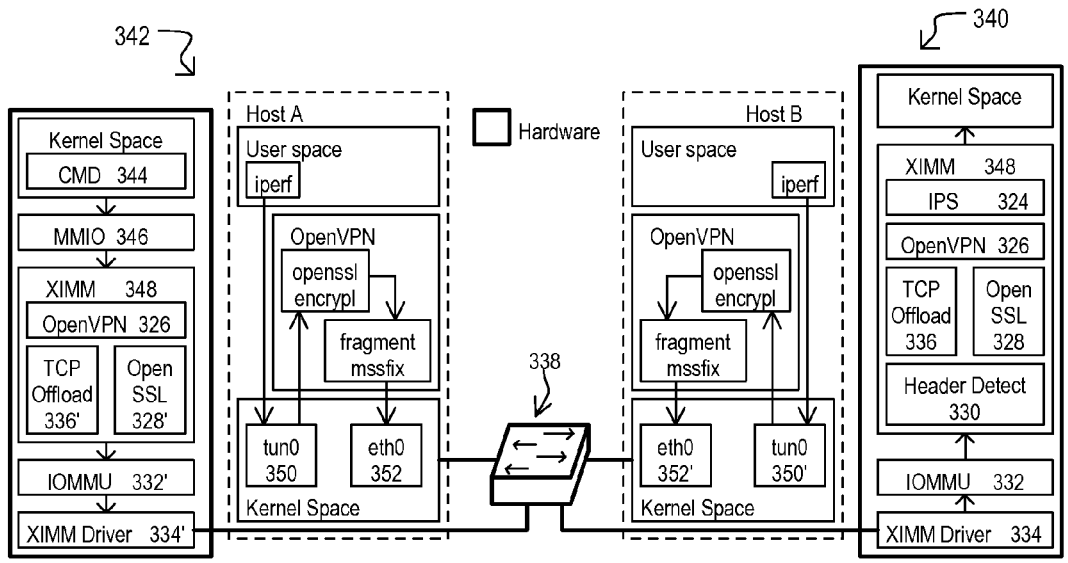

FIG. 3-1 illustrates exemplary software stacks respectively running on a XIMM and an x86-based server processor. A XIMM can include multiple offload processors, and each of the offload processors on the XIMMs can have an operating system such as Apache (300) which runs a stack of software for the packet handling services as described herein, or equivalents. One or more of the offload processors on the XIMM may be dedicated to arbitrating packets between the other offload processors, and may utilize a virtual switching software such as OpenFlow to do so (310). An arbitrating processor can also provide header services (308) by classifying packets by session identifier in preparation for packet-level applications such as signature detection and preprocessing. An arbitration processor can also manage VPN encryption and decryption services (302) using virtual private networking software such as OpenVPN. Input-output memory management software (e.g., IOMMU of 306) can be provided in order to facilitate safe sharing and usage of physical memory when the arbitration processor switches between virtual sessions for incoming packets. Direct memory access (e.g., R/DMA of 306) can allow for direct read/write to an internal memory of a XIMM. Queuing and reassembly functions (320) can take decrypted incoming fragments of data, assemble them into their original form and queue them for processing on one of multiple offload processors onboard the XIMM. Another software function can handle zero-overhead context switching (e.g., ZOCS of 304) in synergy with memory-mapped IO (e.g., MMIO of 304). As packets belonging to different sessions ingress, the offload processors can rapidly switch contexts and read from different parts of memory in order to service them. MMIO and ZOOS can also be crucial in hardware accelerating the signature detection in the IPS portion of the Xockets stack, as the offload processors context switch between each of the input queues representing different signatures without incurring additional overhead. The VPN/IPS services layer (302) provides the algorithms for packet encryption and decryption, as well as signature detection for malicious packet traffic.

On the x86 server processor, an operating system is also present and can run database and analytics software (318, 322), such as a Hadoop and MySQL as but two possible examples. A software hypervisor such as SessionVisor may run as well, providing virtualization services to a plurality of guest OS sessions (312). The hypervisor is responsible for the provisioning of hardware resources to the guest sessions, and also runs virtual switching software such as OpenFlow for directing packets to their destination sessions. An x86 software stack can also include one or more software applications related to the XIMM. In the particular embodiment shown, two XIMM specific software applications are also present. A software application socket (314) facilitates communication between the CPU and the XIMM offload processors, and a NIC driver (316) provides Ethernet-over-DDR tunneling and packet transmission from the NIC to the XIMM.

FIG. 3-2 shows the software stacks described in FIG. 3-1 operating in the context of two servers (340, 342) communicating over an Ethernet-type connection (338). A packet is instantiated in the first server (342) and a kernel command (344) is given to send it through the software stack and over the network. Memory mapped input-output (346) (MMIO) is used to write the packet data into a XIMM on the first server (348), and a software stack prepares the packet for transmission using secure socket layer (SSL) VPN encryption. A VPN tunnel is established between the two servers (350) and the packet is transmitted from the first server's NIC (352) over the network (338). Upon receipt of the packet, the second server's NIC (352') forwards it to a XIMM by way of a custom driver (334). The input-output memory management unit (332) (IOMMU) determines which session the packet belongs to and passes it to the TCP offload stack (336) for header detection (330). An SSL service such as OpenSSL (328) decrypts the packet under the control of VPN software such as OpenVPN (326). An IPS software such as a Suricata (324) then performs signature detection on the packet in order to detect a possible threat, and upon clearance passes it to the kernel.

The following example(s) provide illustration and discussion of exemplary hardware and data processing systems suitable for implementation and operation of the foregoing discussed systems and methods. In particular, hardware and operation of wimpy cores or computational elements connected to a memory bus and mounted in DIMM or other conventional memory socket is discussed.

Figures 1, 4:
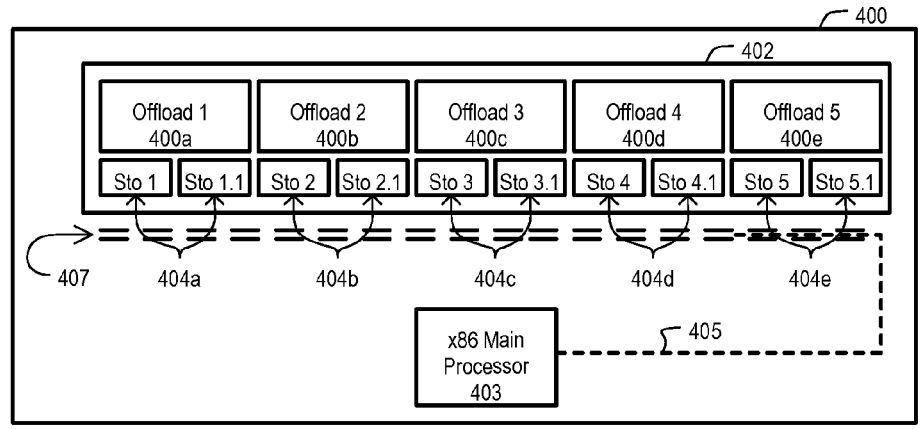
Figures 2, 4:
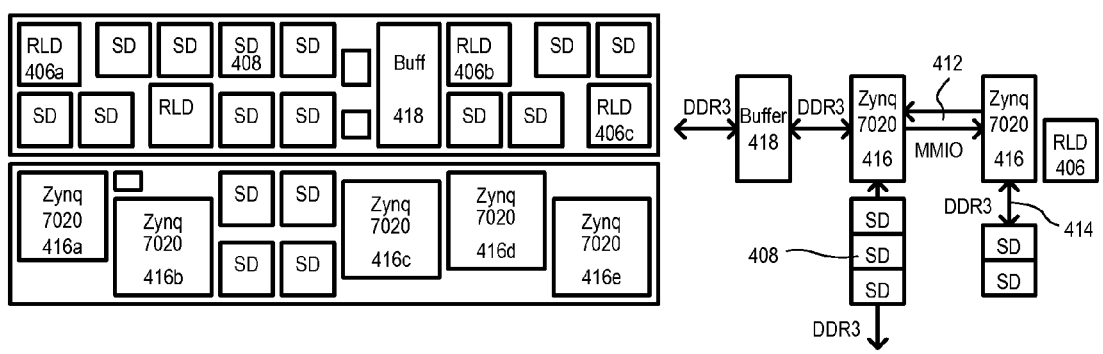

FIG. 4-1 is a cartoon schematically illustrating a data processing system 400 including a removable computation module 402 for offload of data processing from x86 or similar main/server processors 403 to memory bus 405 connected modules, as described herein or equivalents. Such modules 402 can be XIMM modules as described herein, or an equivalent, and can have multiple computation elements that can be referred to as "offload processors" because they offload various "light touch" processing tasks from the main processors (or x86 server), including but not limited to HTML, video, packet level services, security, or data analytics. This is of particular advantage for applications that require frequent random access or application context switching, since many server processors incur significant power usage or have data throughput limitations that can be greatly reduced by transfer of the computation to lower power and more memory efficient offload processors.

The computation elements or offload processors are accessible through memory bus 405. In this embodiment, the module can be inserted into a Dual Inline Memory Module (DIMM) slot on a commodity computer or server using a DIMM connector (407), providing a significant increase in effective computing power to system 400. The XIMM may communicate with other components in the commodity computer or server via one of a variety of busses including but not limited to any version of existing double data rate standards (e.g., DDR, DDR2, DDR3, etc.)

This illustrated embodiment of the XIMM contains five offload processors (400a, 400b, 400c, 400d, 400e) however other embodiments containing greater or fewer numbers of processors are contemplated. The offload processors can be custom manufactured or one of a variety of commodity processors including but not limited to field-programmable grid arrays (FPGA), microprocessors, reduced instruction set computers (RISC), microcontrollers or ARM processors. The computation elements or offload processors can include combinations of computational FPGAs such as those based on Altera, Xilinx (e.g., Artix class), or Zynq architecture (e.g., Zynq 7020), and/or conventional processors such as those based on Intel Atom or ARM architecture (e.g., ARM A9). For many applications, ARM processors having advanced memory handling features such as snoop control unit (SCU) are preferred, since this allows coherent read and write of memory. Other preferred advanced memory features can include processors that support an accelerator coherency port (ACP) that can allow for coherent supplementation of the cache through an FPGA fabric or computational element.

Each offload processor on the XIMM may run one of a variety of operating systems including but not limited to Apache or Linux. In addition, the offload processors may have access to a plurality of dedicated or shared storage methods. In this embodiment, each offload processor connects to two dedicated storage units (404a, 404b, 404c, 404d, 404e) which can be of a variety of storage types, including but not limited to random access memory (RAM), dynamic random access memory (DRAM), sequential access memory (SAM), static random access memory (SRAM), synchronous dynamic random access memory (SDRAM), reduced latency dynamic random access memory (RLDRAM), flash memory, or other emerging memory standards such as those based on DDR4 or hybrid memory cubes (HMC).

FIG. 4-2 shows an example layout of a XIMM module such as that described in FIG. 4-1, as well as a connectivity diagram between the components of the XIMM module. In this example, five Xilinx™ Zynq 7020 (416a, 416b, 416c, 416d, 416e) programmable systems-on-a-chip (SoC) are used as computational FPGAs/offload processors. These offload processors communicate with each other using memory-mapped input-output (MMIO) (412). The types of storage units used in this example are SDRAM (SD, one shown as 408) and RLDRAM (RLD, three shown as 406a, 406b, 406c) and an Inphi™ iMB02 memory buffer 418. Down conversion of 3.3 V to 2.5 volt is required to connect the RLDRAM with the Zynq components. The components are connected to the offload processors and to each other via a DDR3 (414) memory bus. Advantageously, the indicated layout maximizes memory resources availability without requiring a violation of the number of pins available under the DIMM standard.

In this embodiment, one of the Zynq computational FPGAs can act as arbiter providing a memory cache, giving an ability to have peer to peer sharing of data (via memcached or OMQ memory formalisms) between the other Zynq computational FPGAs. All traffic departing for the computational FPGAs is controlled through memory mapped I/O. The arbiter queues session data for use, and when a computational FPGA asks for address outside of the provided session, the arbiter is the first level of retrieval, external processing determination, and predictors set.

FIG. 4-3 shows two possible architectures for a XIMM in a simulation (Xockets MAX and MIN). Xockets MIN (420a) can be used in low-end public cloud servers, containing twenty ARM cores (420b) spread across fourteen DIMM slots in a commodity server which has two Opteron x86 processors and two network interface cards (NICs) (420c). This architecture provides a minimal benefit per Watt of power used. Xockets MAX (422a) contains eighty ARM cores (422b) across eight DIMM slots, in a server with two Opteron x86 processors and four NICs (422c). This architecture can provide a maximum benefit per Watt of power used.

FIG. 4-4 shows a representative power budget for an example of a XIMM according to a particular embodiment. Each component is listed (424a, 424b, 424c, 424d) along with its power profile. Average total and total wattages are also listed (426a, 426b). In total, especially for I/O packet processing with packet sizes on the order 1 KB in size, a low average power budget that is easily able to be provided by the 22 $V_{dd}$ pins per DIMM. Additionally, the expected thermal output can be handled by inexpensive conductive heat spreaders, without requiring additional convective, conductive, or thermoelectric cooling. In certain situations, digital thermometers can be implemented to dynamically reduce performance (and consequent heat generation) if needed.

Figures 1, 5:
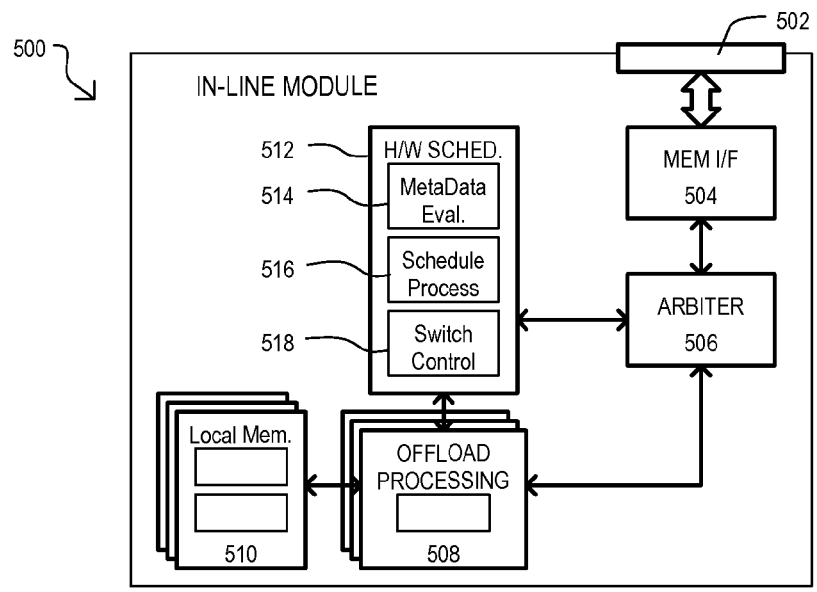
Figures 2, 5:
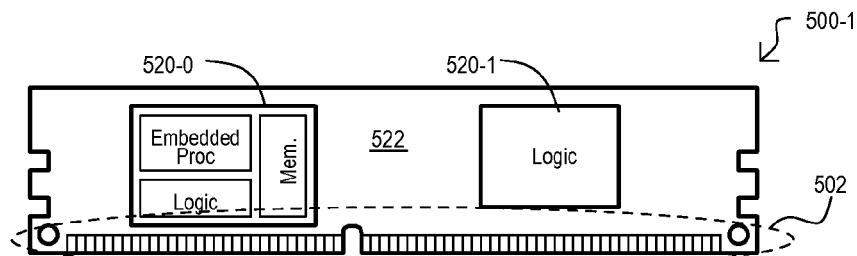
Figures 3, 5:
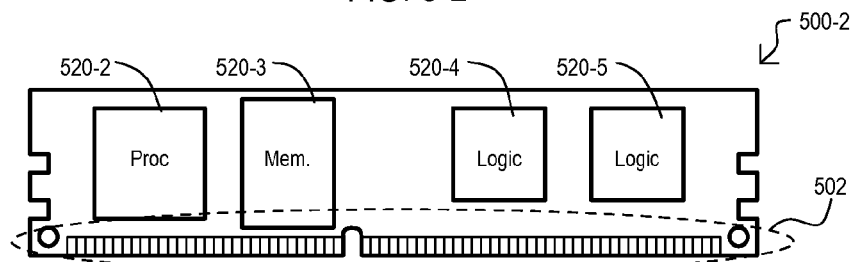
Figures 4, 5:
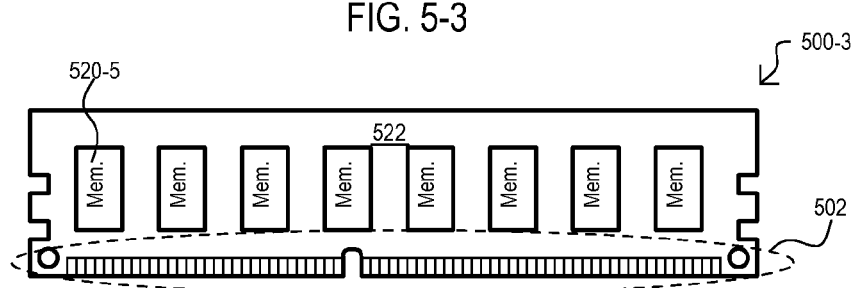
Figure 5:
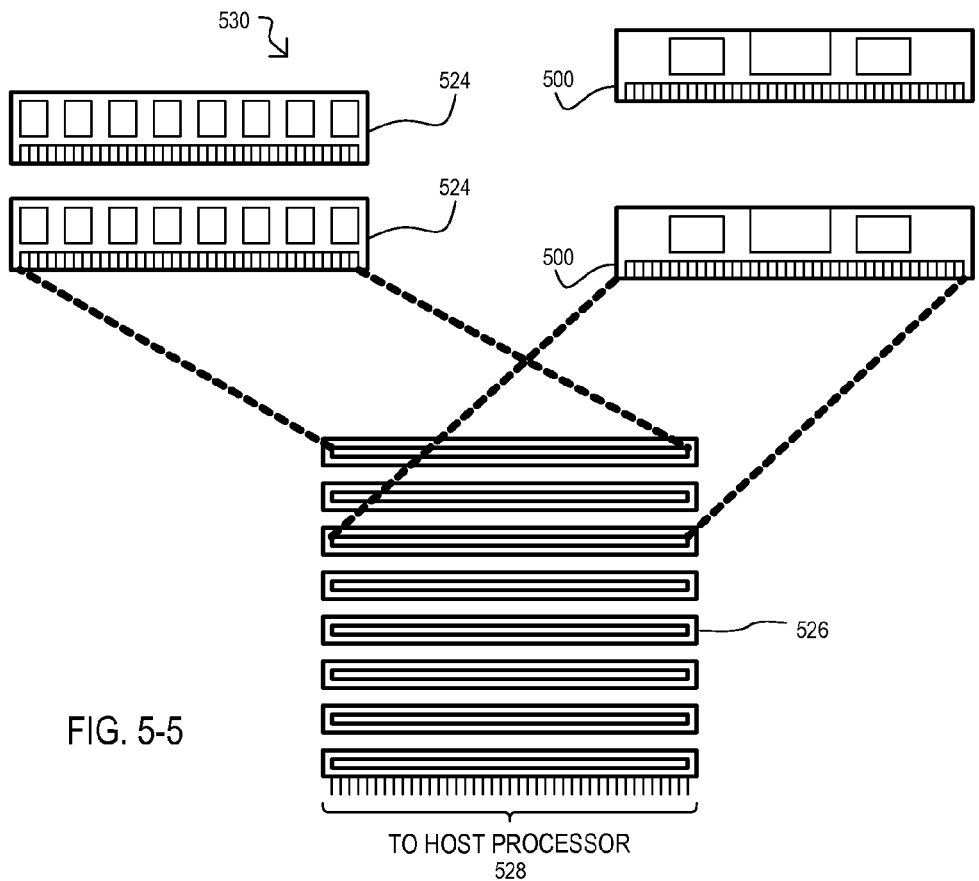

Operation of one embodiment of a XIMM module 430 using an ARM A9 architecture is illustrated with respect to FIG. 4-5. Use of ARM A9 architecture in conjunction with an FPGA fabric and memory, in this case shown as reduced latency DRAM (RLDRAM), can simplify or makes possible zero-overhead context switching, memory compression and CPI, in part by allowing hardware context switching synchronized with network queuing. In this way, there is a one to one mapping between thread and queues. As illustrated, the ARM A9 architecture includes a Snoop Control Unit 432 (SCU). This unit allows one to read out and write in memory coherently. Additionally, the Accelerator Coherency Port 434 (ACP) allows for coherent supplementation of the cache throughout the FPGA 436. The RLDRAM 438 provides the auxiliary bandwidth to read and write the ping-pong cache supplement (435): Block1$ and Block2$ during packet-level meta-data processing.

The following table (Table 1) illustrates potential states that can exist in the scheduling of queues/threads to XIMM processors and memory such as illustrated in FIG. 4-5.

TABLE 1

| Queue/Thread State | HW treatment |
| --- | --- |
| Waiting for Ingress Packet | All ingress data has been processed and thread awaits further communication. |
| Waiting for MMIO | A functional call to MM hardware (such as HW encryption or transcoding) was made. |
| Waiting for Rate-limit | The thread's resource consumption exceeds limit, due to other connections idling. |
| Currently being processed | One of the ARM cores is already processing this thread, cannot schedule again. |
| Ready for Selection | The thread is ready for context selection. |

These states help coordinate the complex synchronization between processes, network traffic, and memory-mapped hardware. When a queue is selected by a traffic manager a pipeline coordinates swapping in the desired L2 cache (440), transferring the reassembled IO data into the memory space of the executing process. In certain cases, no packets are pending in the queue, but computation is still pending to service previous packets. Once this process makes a memory reference outside of the data swapped, a scheduler can require queued data from the network interface card (NIC) to continue scheduling the thread. To provide fair queuing to a process not having data, the maximum context size is assumed as data processed. In this way, a queue must be provisioned as the greater of computational resource and network bandwidth resource, for example, each as a ratio of an 800 MHz A9 and 3 Gbps of bandwidth. Given the lopsidedness of this ratio, the ARM core is generally indicated to be worthwhile for computation having many parallel sessions (such that the hardware's prefetching of session-specific data and TCP/reassembly offloads a large portion of the CPU load) and those requiring minimal general purpose processing of data.

Essentially zero-overhead context switching is also possible using XIMM modules as disclosed in FIG. 4-5. Because per packet processing has minimum state associated with it, and represents inherent engineered parallelism, minimal memory access is needed, aside from packet buffering. On the other hand, after packet reconstruction, the entire memory state of the session can be accessed, and so requires maximal memory utility. By using the time of packet-level processing to prefetch the next hardware scheduled application-level service context in two different processing passes, the memory can always be available for prefetching. Additionally, the FPGA 436 can hold a supplemental "ping-pong" cache (435) that is read and written with every context switch, while the other is in use. As previously noted, this is enabled in part by the SCU 432, which allows one to read out and write in memory coherently, and ACP 434 for coherent supplementation of the cache throughout the FPGA 436. The RLDRAM 438 provides for read and write to the ping-pong cache supplement (435): Block1$ and Block2$ during packet-level meta-data processing. In the embodiment shown, only locally terminating queues can prompt context switching.

In operation, metadata transport code can relieve a main or host processor from tasks including fragmentation and reassembly, and checksum and other metadata services (e.g., accounting, IPSec, SSL, Overlay, etc.). As IO data streams in and out, L1 cache 437 can be filled during packet processing. During a context switch, the lock-down portion of a translation lookaside buffer (TLB) of an L1 cache can be rewritten with the addresses corresponding to the new context. In one very particular implementation, the following four commands can be executed for the current memory space.

MRC p15,0,r0,c10,c0,0; read the lockdown register
BIC r0,r0,#1; clear preserve bit
MCR p15,0,r0,c10,c0,0; write to the lockdown register;
write to the old value to the memory mapped Block RAM Bandwidths and capacities of the memories can be precisely allocated to support context switching as well as applications such as Openflow processing, billing, accounting, and header filtering programs.

For additional performance improvements, the ACP 434 can be used not just for cache supplementation, but hardware functionality supplementation, in part by exploitation of the memory space allocation. An operand is written to memory and the new function called, through customizing specific Open Source libraries, so putting the thread to sleep and the hardware scheduler validates it for scheduling again once the results are ready. For example, OpenVPN uses the OpenSSL library, where the encrypt/decrypt functions can be memory mapped. Large blocks are then available to be exported without delay, or consuming the L2 cache 440, using the ACP. Hence, a minimum number of calls are needed within the processing window of a context switch, improving overall performance.

FIG. 5-1 is a block diagram of a processing module 500 according to another embodiment. A processing module 500 can be one implementation of XIMM as described herein. A processing module 500 can include a physical in-line module connector 502, a memory interface 504, arbiter logic 506, offload processor(s) 508, local memory 510, and control logic 512. A connector 502 can provide a physical connection to system memory bus. This is in contrast to a host processor which can access a system memory bus via a memory controller, or the like. In very particular embodiments, a connector 502 can be compatible with a dual in-line memory module (DIMM) slot of a computing system. Accordingly, a system including multiple DIMM slots can be populated with one or more processing modules 500, or a mix of processing modules and DIMM modules.

A memory interface 504 can detect data transfers on a system memory bus, and in appropriate cases, enable write data to be stored in the processing module 500 and/or read data to be read out from the processing module 500. In some embodiments, a memory interface 504 can be a slave interface, thus data transfers are controlled by a master device separate from the processing module. In very particular embodiments, a memory interface 504 can be a direct memory access (DMA) slave, to accommodate DMA transfers over a system memory initiated by a DMA master. Such a DMA master can be a device different from a host processor. In such configurations, processing module 500 can receive data for processing (e.g., DMA write), and transfer processed data out (e.g., DMA read) without consuming host processor resources.

Arbiter logic 506 can arbitrate between conflicting data accesses within processing module 500. In some embodiments, arbiter logic 506 can arbitrate between accesses by offload processor 508 and accesses external to the processor module 500. It is understood that a processing module 500 can include multiple locations that are operated on at the same time. It is also understood that accesses that are arbitrated by arbiter logic 506 can include accesses to physical system memory space occupied by the processor module 500, as well as accesses to resources (e.g., processor resources). Accordingly, arbitration rules for arbiter logic 506 can vary according to application. In some embodiments, such arbitration rules are fixed for a given processor module 500. In such cases, different applications can be accommodated by switching out different processing modules. However, in alternate embodiments, such arbitration rules can be configurable while the module is connected to a data bus.

Offload processor(s) 508 can include one or more processors that can operate on data transferred over the system memory bus. In some embodiments, offload processors can run a general operating system, enabling processor contexts to be saved and retrieved. Computing tasks executed by offload processor 508 can be controlled by control logic 512. Offload processor(s) 508 can operate on data buffered in the processing module 500. In addition or alternatively, offload processor(s) 508 can access data stored elsewhere in a system memory space. In some embodiment, offload processor(s) 508 can include a cache memory configured to store context information. An offload processor(s) 508 can include multiple cores or one core.

A processing module 500 can be included in a system having a host processor (not shown). In some embodiments, offload processors 508 can be a different type of processor as compared to the host processor. In particular embodiments, offload processors 508 can consume less power and/or have less computing power than a host processor. In very particular embodiments, offload processors 508 can be "wimpy" core processors, while a host processor can be a "brawny" core processor. In alternate embodiments, offload processors 508 can have equivalent or greater computing power than any host processor.

Local memory 510 can be connected to offload processor(s) 508 to enable the storing of context information. Accordingly, offload processor(s) 508 can store current context information, and then switch to a new computing task, then subsequently retrieve the context information to resume the prior task. In very particular embodiments, local memory 510 can be a low latency memory with respect to other memories in a system. In some embodiments, storing of context information can include copying a cache of an offload processor 508 to the local memory 510.

In some embodiments, a same space within local memory 510 is accessible by multiple offload processors 508 of the same type. In this way, a context stored by one offload processor can be resumed by a different offload processor.

Control logic 512 can control processing tasks executed by offload processor(s) 508. In some embodiments, control logic 512 can be considered a hardware scheduler that can be conceptualized as including a data evaluator 514, scheduler 516 and a switch controller 518. A data evaluator 514 can extract "metadata" from write data transferred over a system memory bus. "Metadata", as used herein, can be any information embedded at one or more predetermined locations of a block of write data that indicates processing to be performed on all or a portion of the block of write data. In some embodiments, metadata can be data that indicates a higher level organization for the block of write data. As but one very particular embodiment, metadata can be header information of network packet (which may or may not be encapsulated within a higher layer packet structure).

A scheduler 516 can order computing tasks for offload processor(s) 508. In some embodiments, scheduler 516 can generate a schedule that is continually updated as write data for processing is received. In very particular embodiments, a scheduler 516 can generate such a schedule based on the ability to switch contexts of offload processor(s) 508. In this way, module computing priorities can be adjusted on the fly. In very particular embodiments, a scheduler 516 can assign a portion of physical address space to an offload processor 508, according to computing tasks. The offload processor 508 can then switch between such different spaces, saving context information prior to each switch, and subsequently restoring context information when returning to the memory space.

Switch controller 518 can control computing operations of offload processor(s) 508. In particular embodiments, according to scheduler 516, switch controller 518 can order offload processor(s) 510 to switch contexts. It is understood that a context switch operation can be an "atomic" operation, executed in response to a single command from switch controller 518. In addition or alternatively, a switch controller 518 can issue an instruction set that stores current context information, recalls context information, etc.

In some embodiments, processing module 500 can include a buffer memory (not shown). A buffer memory can store received write data on-board the processor module 500. A buffer memory can be implemented on an entirely different set of memory devices, or can be a memory embedded with logic and/or the offload processor. In the latter case, arbiter logic 506 can arbitrate access to the buffer memory. In some embodiments, a buffer memory can correspond to a portion of a system physical memory space. The remaining portion of the system memory space can correspond to other like processor modules and/or memory modules connected to the same system memory bus. In some embodiments buffer memory can be different than local memory 510. For example, buffer memory can have a slower access time than a local memory 510. However, in other embodiments, buffer memory and local memory can be implemented with like memory devices.

In very particular embodiments, write data for processing can have an expected maximum flow rate. A processor module 500 can be configured to operate on such data at, or faster than, such a flow rate. In this way, a master device (not shown) can write data to a processor module without danger of overwriting data "in process".

The various computing elements of a processor module 500 can be implemented as one or more integrated circuit devices (ICs). It is understood that the various components shown in FIG. 5-1 can be formed in the same or different ICs. For example, control logic 512, memory interface 514, and/or arbiter logic 506 can be implemented on one or more logic ICs, while offload processor(s) 508 and local memory 510 are separate ICs. Logic ICs can be fixed logic (e.g., application specific ICs), programmable logic (e.g., field programmable gate arrays, FPGAs), or combinations thereof.

FIG. 5-2 shows a processor module 500-1 according to one very particular embodiment. A processor module 500-1 can include ICs 520-0/1 mounted to a printed circuit board (PCB)

type substrate 522. PCB type substrate 522 can include in-line module connection 502, which in one very particular embodiment can be a DIMM compatible connection. IC 520-0 can be a system-on-chip (SoC) type device, integrating multiple functions. In the very particular embodiment shown, an IC 520-0 can include embedded processor(s), logic and memory. Such embedded processor(s) can be offload processor(s) 508 as described herein, or equivalents. Such logic can be any of controller logic 512, memory interface 504 and/or arbiter logic 506, as described herein, or equivalents. Such memory can be any of local memory 510, cache memory for offload processor(s) 508, or buffer memory, as described herein, or equivalents. Logic IC 520-1 can provide logic functions not included IC 520-0.

FIG. 5-3 shows a processor module 500-2 according to another very particular embodiment. A processor module 500-2 can include ICs 520-2, -3, -4, -5 mounted to a PCB type substrate 522, like that of FIG. 5-2. However, unlike FIG. 5-2, processor module functions are distributed among single purpose type ICs. IC 520-2 can be a processor IC, which can be an offload processor 508. IC 520-3 can be a memory IC which can include local memory 510, buffer memory, or combinations thereof. IC 520-4 can be a logic IC which can include control logic 512, and in one very particular embodiment, can be an FPGA. IC 520-5 can be another logic IC which can include memory interface 504 and arbiter logic 506, and in one very particular embodiment, can also be an FPGA.

It is understood that FIGS. 5-2 and 5-3 represent but two of various implementations. The various functions of a processor module can be distributed over any suitable number of ICs, including a single SoC type IC.

FIG. 5-4 shows an opposing side of a processor module 500-3 according to a very particular embodiment. Processor module 500-3 can include a number of memory ICs, one shown as 520-5, mounted to a PCB type substrate 522, like that of FIG. 5-2. It is understood that various processing and logic components can be mounted on an opposing side to that shown. Memory ICs 520-5 can be configured to represent a portion of the physical memory space of a system. Memory ICs 520-5 can perform any or all of the following functions: operate independently of other processor module components, providing system memory accessed in a conventional fashion; serve as buffer memory, storing write data that can be processed with other processor module components; or serve as local memory for storing processor context information.

FIG. 5-4 can also represent a conventional DIMM module (i.e., it serves only a memory function) that can populate a memory bus along with processor modules as described herein, or equivalents.

FIG. 5-5 shows a system 530 according to one embodiment. A system 530 can include a system memory bus 528 accessible via multiple in-line module slots (one shown as 526). According to embodiments, any or all of the slots 526 can be occupied by a processor module 500 as described herein, or an equivalent. In the event all slots 526 are not occupied by a processor module 500, available slots can be occupied by conventional in-line memory modules 524. In a very particular embodiment, slots 526 can be DIMM slots.

In some embodiments, a processor module 500 can occupy one slot. However, in other embodiments, a processor module can occupy multiple slots (i.e., include more than one connection). In some embodiments, a system memory bus 528 can be further interfaced with one or more host processors and/or input/output devices (not shown).

Having described processor modules according to various embodiments, operations of a processor module according to particular embodiments will now be described. FIGS. 5-6 to 5-11 show processor module operations according to various embodiments. FIGS. 5-1-06 to 5-1-511 show a processor module like that of FIG. 5-1, along with a system memory bus 528, and a buffer memory 532. It is understood that in some embodiments, a buffer memory 532 can part of processor module 500. In such a case, arbitration between accesses via system memory 528 and offload processors can be controlled by arbiter logic 506.

Figures 5, 6:
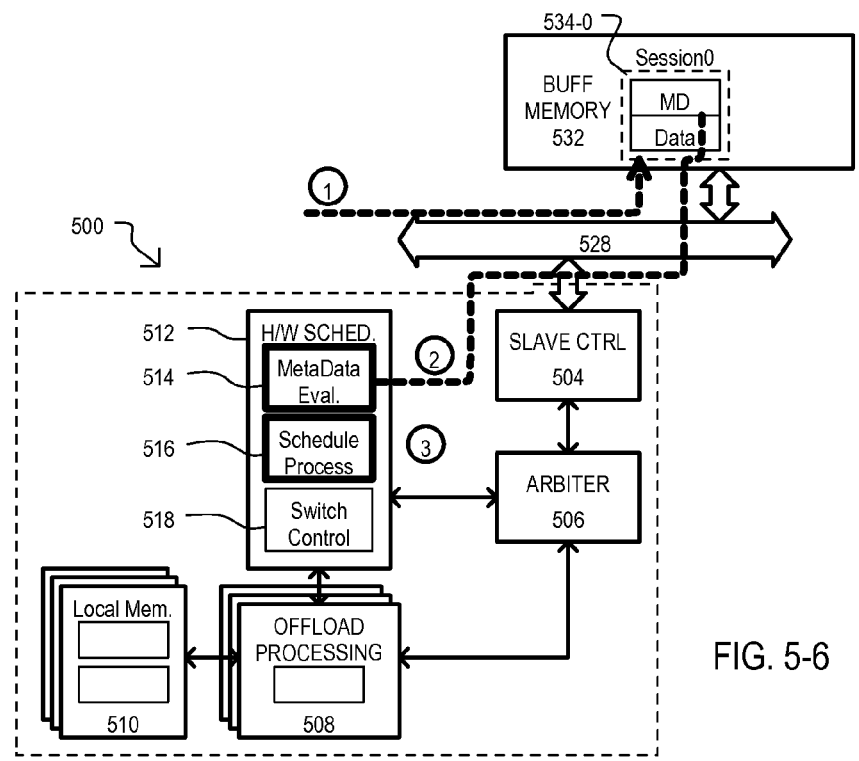

Referring to FIG. 5-6, write data 534-0 can be received on system memory bus 528 (circle "1"). In some embodiments, such an action can include the writing of data to a particular physical address space range of a system memory. In a very particular embodiment, such an action can be a DMA write independent of any host processor. Write data 534-0 can include metadata (MD) as well as data to be processed (Data). In the embodiment shown, write data 534-0 can correspond to a particular processing operation (Session0).

Control logic 512 can access metadata (MD) of the write data 534-0 to determine a type of processing to be performed (circle "2"). In some embodiments, such an action can include a direct read from a physical address (i.e., MD location is at a predetermined location). In addition or alternatively, such an action can be an indirect read (i.e., MD is accessed via pointer, or the like). The action shown by circle "2" can be performed by any of: a read by control logic 512 or read by an offload processor 508. From extracted metadata, scheduler 516 can create a processing schedule, or modify an existing schedule to accommodate the new computing task (circle "3").

Figures 5, 6, 7:
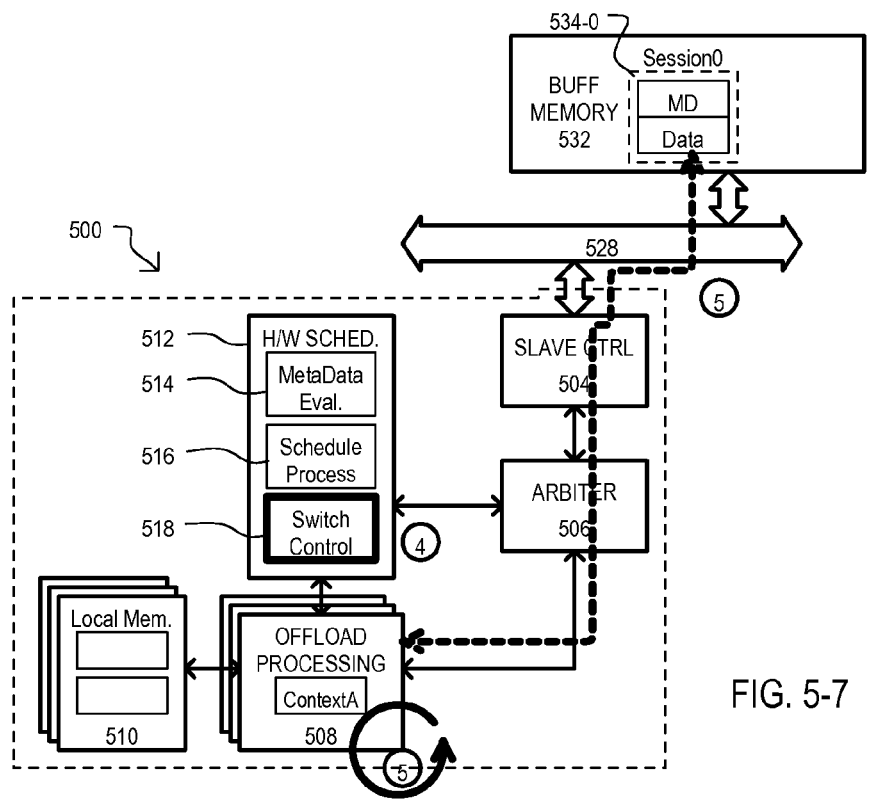
Figures 5, 6, 7, 8:
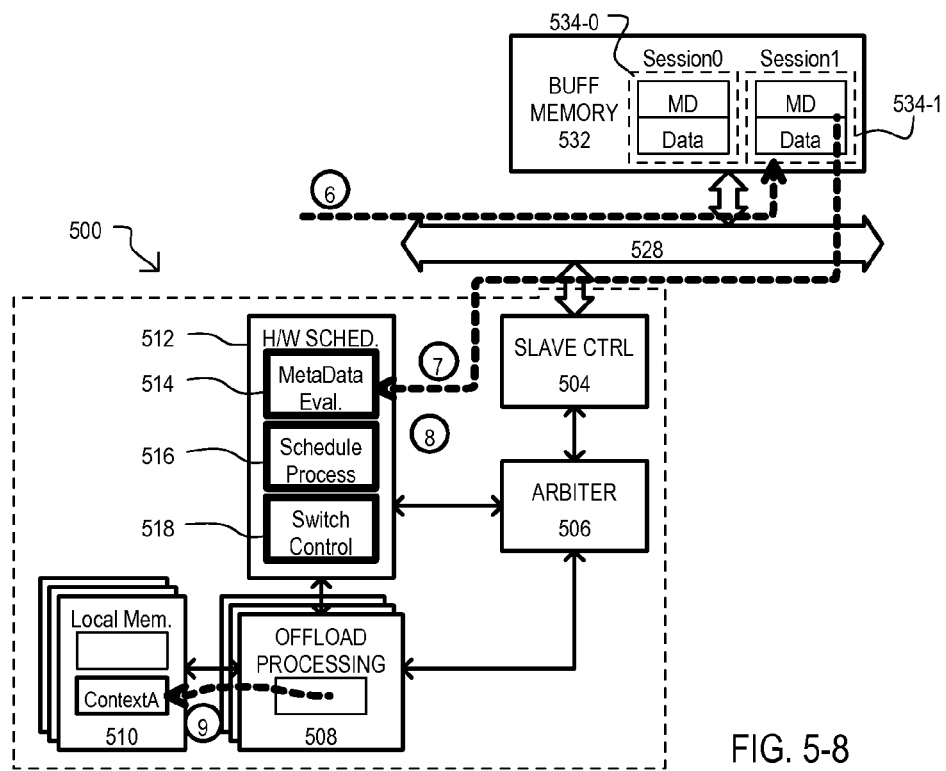
Figures 5, 6, 7, 8, 9:
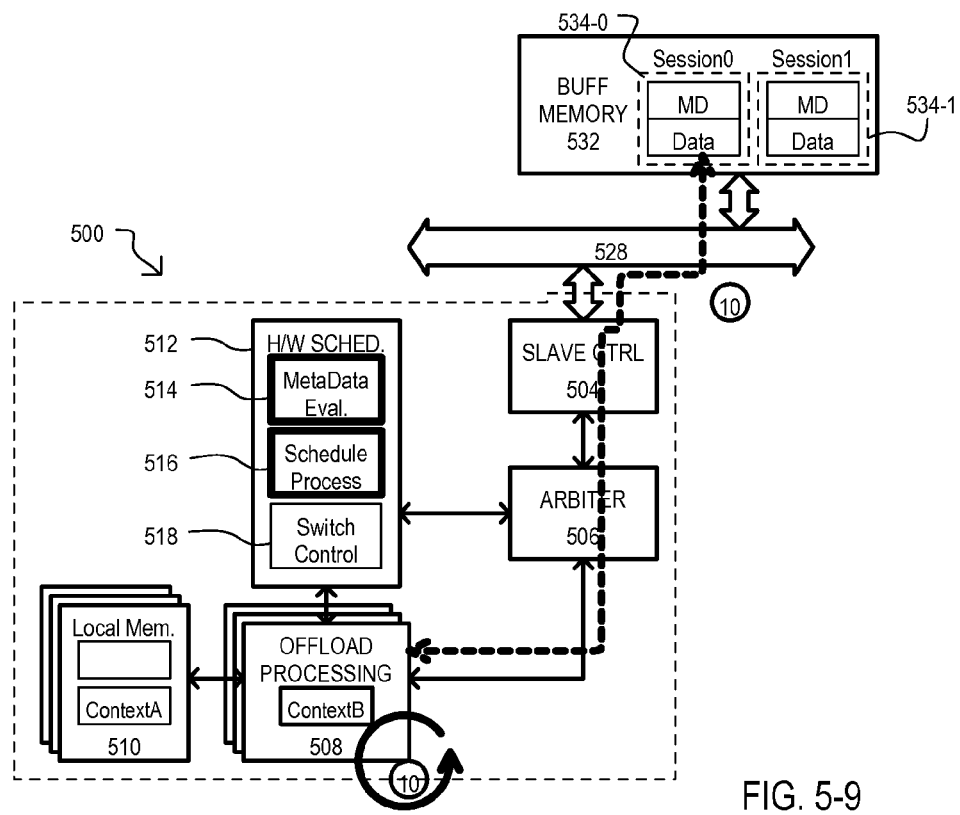
Figures 5, 6, 7, 8, 9, 10:
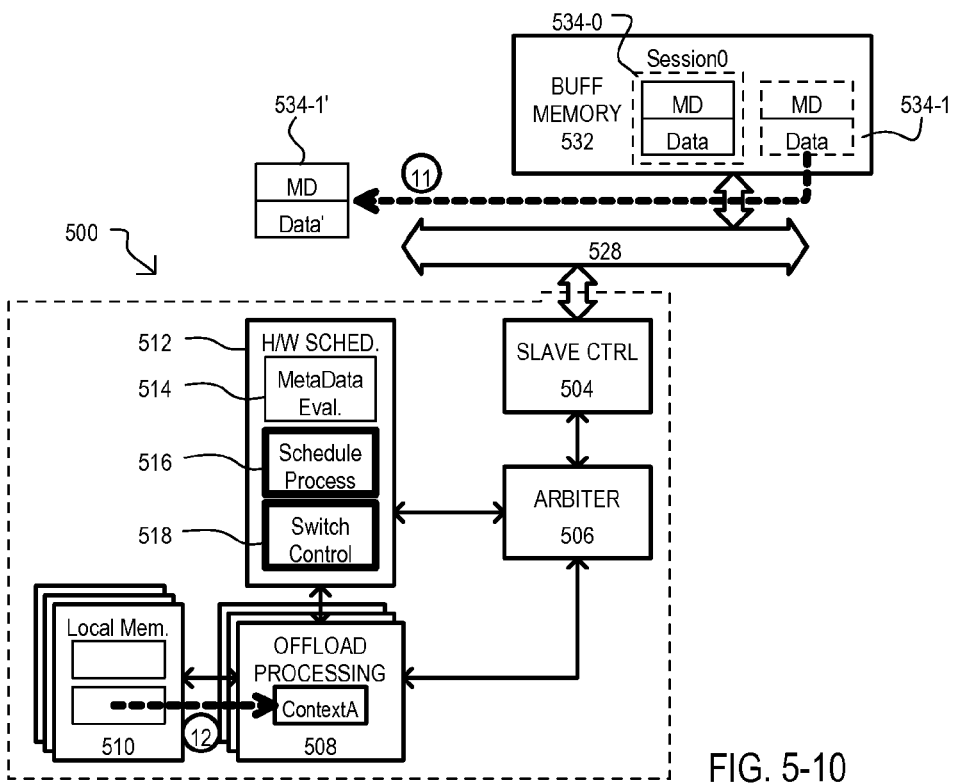
Figures 5, 6, 7, 8, 9, 10, 11:
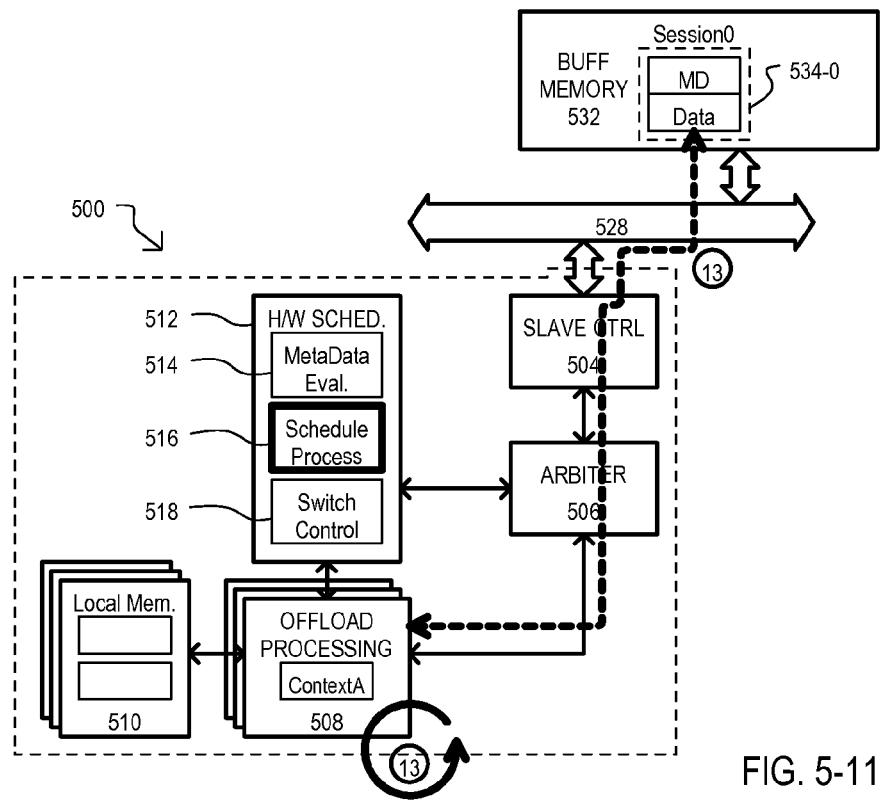
Figures 5, 6, 7, 8, 9, 10, 11, 12:
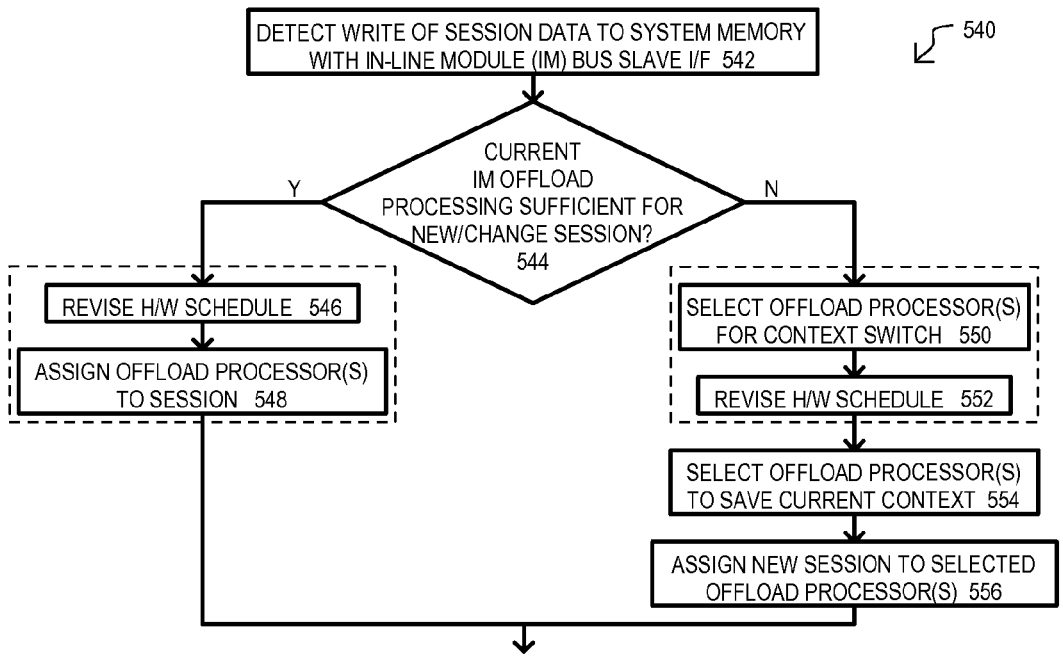
Figures 5, 6, 7, 8, 9, 10, 11, 12, 13:
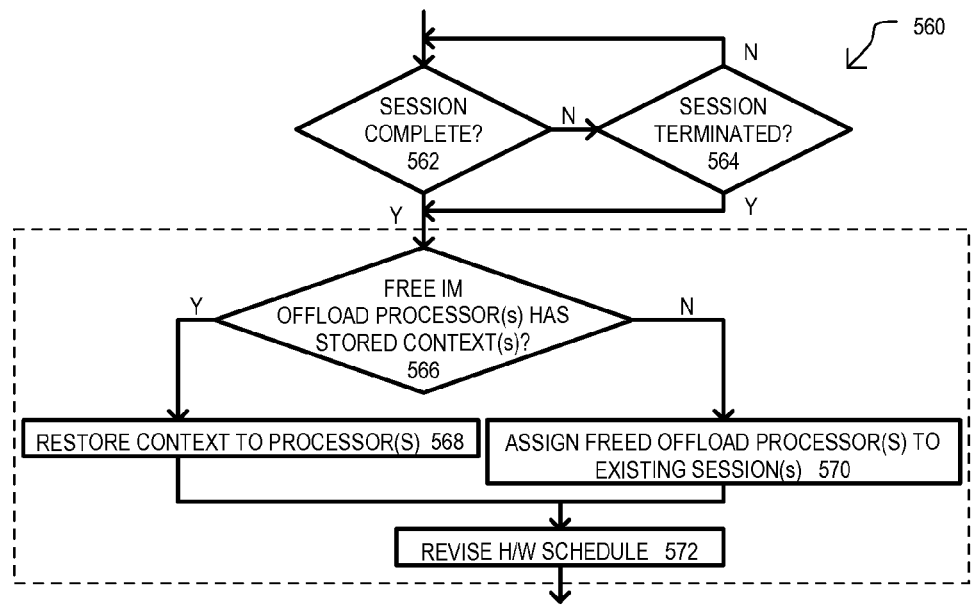
Figures 1, 6:
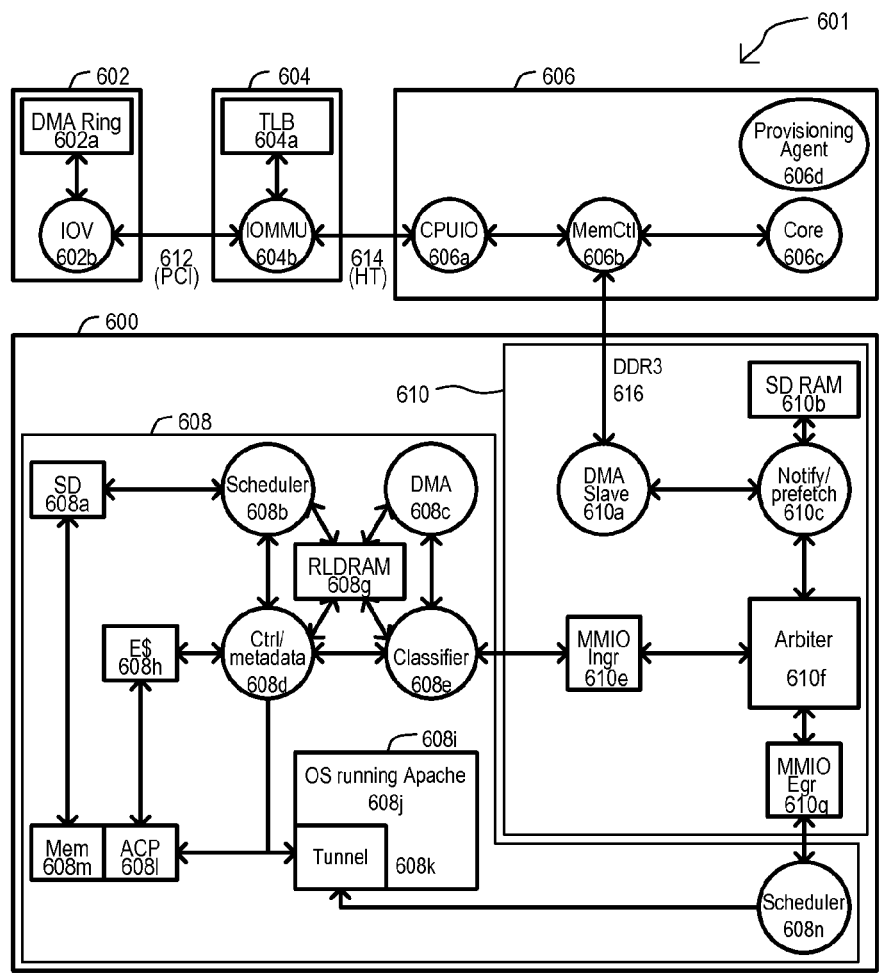
Figures 2, 6:
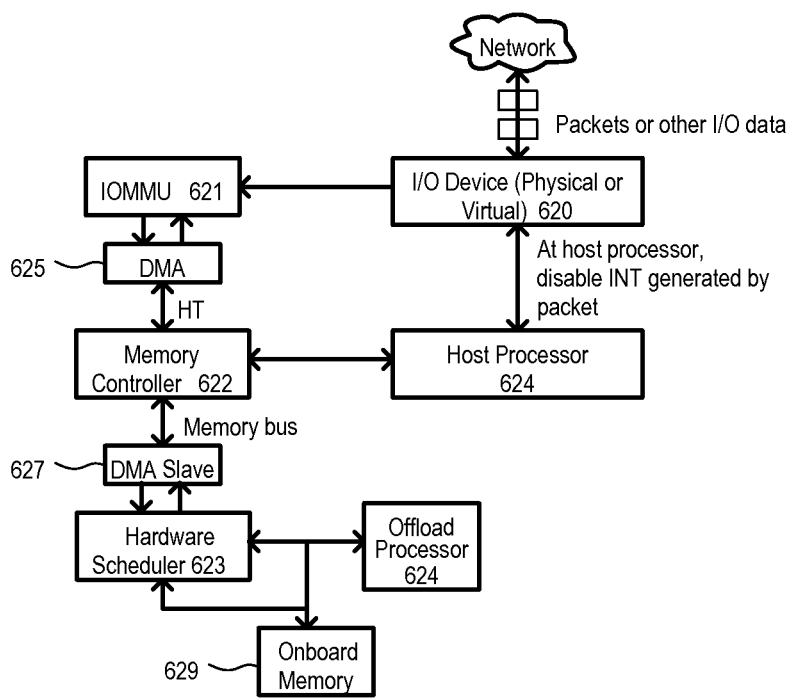

Referring to FIG. 5-7, in response to a scheduler 516, switch controller 518 can direct one or more offload processors 508 be begin processing data according to MD of the write data (circles "4", "5"). Such processing of data can include any of the following and equivalents: offload processor 508 can process write data stored in a buffer memory of the processor module 500, with accesses being arbitrated by arbiter logic 506; offload processor 508 can operate on data previously received; offload processor 508 can receive and operation on data stored at a location different than the processor module 500.

Referring to FIG. 5-8, additional write data 534-1 can be received on system memory bus 528 (circle "6"). Write data 534-1 can include MD that indicates a different processing operation (Session1) than that for write data 534-0. Control logic 512 can access metadata (MD) of the new write data 534-1 to determine a type of processing to be performed (circle "7"). From extracted metadata, scheduler 516 can modify the current schedule to accommodate the new computing task (circle "8"). In the particular example shown, the modified schedule re-tasks offload processor(s) 508. Thus, switch controller 518 can direct an offload processor 508 to store its current context (ContextA) in local memory 510 (circle "9").

Referring to FIG. 5-9, in response to switch controller 518, offload processor(s) 508 can begin the new processing task (circle "10"). Consequently, offload processor(s) 508 can maintain a new context (ContextB) corresponding to the new processing task.

Referring to FIG. 5-10, a processing task by offload processor 508 can be completed. In the very particular embodiment shown, such processing can modify write data (534-1) and such modified data 534-1' can be read out over system memory bus 528 (circle "11"). In response to the completion of processing task, scheduler 516 can update a schedule. In the example shown, in response to the updated schedule, switch controller 518 can direct offload processor(s) 508 to restore the previously saved context (ContextA) from local memory 510 (circle "12"). As understood from above, in some particular embodiments, a restored context (e.g., ContextA) may have been stored by an offload processor different from the one that saved the context in the first place.

Referring to FIG. 5-11, with a previous context restored, offload processor(s) 508 can return to processing data according to the previous task (Session0) (circle "13").

FIG. 5-12 shows a method 540 according an embodiment. A method 540 can include detecting the write of session data to a system memory with an in-line module slave interface 542. Such an action can include determining if received write data has metadata (i.e., data identifying a particular processing). It is understood that "session data" is data corresponding to a particular processing task. Further, it is understood that MD accompanying (or embedded within) session data can identify the priority of a session with respect to other sessions.

A method 540 can determine if current offload processing is sufficient for a new session or change of session 544. Such an action take into account a processing time required for any current sessions.

If current processing resources can accommodate new session requirements (Y from 544), a hardware schedule (schedule for controlling offload processor(s)) can be revised and the new session can be assigned to an offload processor. If current processing resources cannot accommodate new session requirements (N from 544), one or more offload processors can be selected for re-tasking (e.g., a context switch) 550 and the hardware schedule can be modified accordingly 552. The selected offload processors can save their current context data 554 and then switch to the new session 556.

FIG. 5-13 shows a method 560 according another embodiment. A method 560 can include determining if a computing session for an offload processor is complete 562 or has been terminated 564. In such cases (Y from 562/564), it can be determined if the free in-line module offload processor (i.e., an offload processor whose session is complete/terminated) has a stored context 566. That is, it can be determined if the free processor was previously operating on a session.

If a free offload processor was operating according to another session (Y from 566), the offload processor can restore the previous context 568. If a free offload processor has no stored context, it can be assigned to an existing session (if possible) 570. An existing hardware schedule can be updated correspondingly 572.

Processor modules according to embodiments herein can be employed to accomplish various processing tasks. According to some embodiments, processor modules can be attached to a system memory bus to operate on network packet data. Such embodiments will now be described.

FIG. 6-1 shows a system 601 that can transport packet data to one or more computational units (one shown as 600) located on a module, which in particular embodiments, can include a connector compatible with an existing memory module. In some embodiments, a computational unit 600 can include a processor module (e.g., XIMM) as described in embodiments herein, or an equivalent. A computational unit 600 can be capable of intercepting or otherwise accessing packets sent over a memory bus 616 and carrying out processing on such packets, including but not limited to termination or metadata processing. A system memory bus 616 can be a system memory bus like those described herein, or equivalents (e.g., 528).

According to some embodiments, packets corresponding to a particular flow can be transported to a storage location accessible by, or included within computational unit 600. Such transportation can occur without consuming resources of a host processor module 606c connected to memory bus 616. In particular embodiments, such transport can occur without interrupting the host processor module 606c. In such an arrangement, a host processor module 606c does not have to handle incoming flows. Incoming flows can be directed to computational unit 600, which in particular embodiments can include one or more general purpose processors 608i. Such general purpose processors 608i can be capable of running code for terminating incoming flows.

In one very particular embodiment, a general purpose processor 608i can run code for terminating particular network flow session types, such as Apache video sessions, as but one example.

In addition or alternatively, a general purpose processor 608i can process metadata of a packet. In such embodiments, such metadata can include one or more fields of a header for the packet, or a header encapsulated further within the packet.

Referring still to FIG. 6-1, according to embodiments, a system 601 can carry out any of the following functions: 1) transport packets of a flow to a destination occupied by, or accessible by, a computational unit 600 without interrupting a host processor module 606c; 2) transport packets to an offload processor 608i capable of terminating session flows (i.e., the offload processor is responsible for terminating session flows); 3) transport packets to a midplane switch that can process the metadata associated with a packet and make a switching decision; or 4) provide a novel high speed packet terminating system.

Conventional packet processing systems can utilize host processors for packet termination. However, due to the context switching involved in handling multiple sessions, conventional approaches require significant processing overhead for such context switching, and can incur memory access and network stack delay.

In contrast to conventional approaches, embodiments as disclosed herein can enable high speed packet termination by reducing context switch overhead of a host processor. Embodiments can provide any of the following functions: 1) offload computation tasks to one or more processors via a system memory bus, without the knowledge of the host processor, or significant host processor involvement; 2) interconnect servers in a rack or amongst racks by employing offload processors as switches; or 3) use I/O virtualization to redirect incoming packets to different offload processors.

Referring still to FIG. 6-1, a system 601 can include an I/O device 602 which can receive packet or other I/O data from an external source. In some embodiments I/O device 602 can include physical or virtual functions generated by the physical device to receive a packet or other I/O data from the network or another computer or virtual machine. In the very particular embodiment shown, an I/O device 602 can include a network interface card (NIC) having input buffer 602a (e.g., DMA ring buffer) and an I/O virtualization function 602b.

According to embodiments, an I/O device 602 can write a descriptor including details of the necessary memory operation for the packet (i.e. read/write, source/destination). Such a descriptor can be assigned a virtual memory location (e.g., by an operating system of the system 601). I/O device 602 can communicate with an input output memory management unit (IOMMU) 604 which can translate virtual addresses to corresponding physical addresses. In the particular embodiment shown, a translation look-aside buffer (TLB) 604a can be used for such translation. Virtual function reads or writes data between I/O device and system memory locations can then be executed with a direct memory transfer (e.g., DMA) via a memory controller 606b of the system 601. An I/O device 602 can be connected to IOMMU 604b by a host bus 612. In one very particular embodiment, a host bus 612 can be a peripheral interconnect (PCI) type bus. IOMMU 604*b* can be connected to a host processing section 606 at a central processing unit I/O (CPUIO) 606*a*. In the embodiment shown, such a connection 664 can support a HyperTransport (HT) protocol.

In the embodiment shown, a host processing section 606 can include the CPUIO 606*a*, memory controller 606*b*, host processor module 606*c* and corresponding provisioning agent 606*d*.

In particular embodiments, a computational unit 600 can interface with the system bus 616 via standard in-line module connection, which in very particular embodiments can include a DIMM type slot. In the embodiment shown, a memory bus 616 can be a DDR3 type memory bus, however alternate embodiments can include any suitable system memory bus. Packet data can be sent by memory controller 606*b* to via memory bus 616 to a DMA slave interface 610*a*. DMA slave interface 610*a* can be adapted to receive encapsulated read/write instructions from a DMA write over the memory bus 616.

A hardware scheduler (608*b/c/d/e/h*) can perform traffic management on incoming packets by categorizing them according to flow using session metadata. Packets can be queued for output in an onboard memory (610*b*/608*a*/608*m*) based on session priority. When the hardware scheduler determines that a packet for a particular session is ready to be processed by the offload processor 608*i*, the onboard memory is signaled for a context switch to that session. Utilizing this method of prioritization, context switching overhead can be reduced, as compared to conventional approaches. That is, a hardware scheduler can handle context switching decisions and thus optimizing the performance of the downstream resource (e.g., offload processor 608*i*).

As noted above, in very particular embodiments, an offload processor 608*i* can be a "wimpy" core type processor. According to some embodiments, a host processor module 606*c* can include a "brawny" core type processor (e.g., an x86 or any other processor capable of handling "heavy touch" computational operations). While an I/O device 602 can be configured to trigger host processor interrupts in response to incoming packets, according to embodiments, such interrupts can be disabled, thereby reducing processing overhead for the host processor module 606*c*. In some very particular embodiments, an offload processor 608*i* can include an ARM, ARC, Tensilica, MIPS, Strong/ARM or any other processor capable of handling "light touch" operations. Preferably, an offload processor can run a general purpose operating system for executing a plurality of sessions, which can be optimized to work in conjunction with the hardware scheduler in order to reduce context switching overhead.

Referring still to FIG. 6-1, in operation, a system 601 can receive packets from an external network over a network interface. The packets can be directed for processing by either a host processor module 606*c* or an offload processor 608*i* based on the classification logic and schematics employed by I/O device 602. In particular embodiments, I/O device 602 can operate as a virtualized NIC, with packets for a particular logical network or to a certain virtual MAC (VMAC) address being directed into separate queues and sent over to the destination logical entity. Such an arrangement can transfer packets to different entities. In some embodiments, each such entity can have a virtual driver, a virtual device model that it uses to communicate with virtual network interfaces it is connected to.

According to embodiments, multiple devices can be used to redirect traffic to specific memory addresses. So, each of the network devices operates as if it is transferring the packets to the memory location of a logical entity. However, in reality, such packets can be transferred to memory addresses where they can be handled by one or more offload processors. In particular embodiments such transfers are to physical memory addresses, thus logical entities can be removed from the processing, and a host processor can be free from such packet handling.

Accordingly, embodiments can be conceptualized as providing a memory "black box" to which specific network data can be fed. Such a memory black box can handle the data (e.g., process it) and respond back when such data is requested.

Referring still to FIG. 6-1, according to some embodiments, I/O device 602 can receive data packets from a network or from a computing device. The data packets can have certain characteristics, including transport protocol number, source and destination port numbers, source and destination IP addresses, for example. The data packets can further have metadata that is processed (608*d*) that helps in their classification and management.

I/O device 602 can include, but is not limited to, peripheral component interconnect (PCI) and/or PCI express (PCIe) devices connecting with host motherboard via PCI or PCIe bus (e.g., 612). Examples of I/O devices include a network interface controller (NIC), a host bus adapter, a converged network adapter, an ATM network interface etc.

In order to provide for an abstraction scheme that allows multiple logical entities to access the same I/O device 602, the I/O device may be virtualized to provide for multiple virtual devices each of which can perform some of the functions of the physical I/O device. The IO virtualization program, according to an embodiment, can redirect traffic to different memory locations (and thus to different offload processors attached to modules on a memory bus). To achieve this an I/O device 602 (e.g., a network card) may be partitioned into several function parts; including controlling function (CF) supporting input/output virtualization (IOV) architecture (e.g., single-root IOV) and multiple virtual function (VF) interfaces. Each virtual function interface may be provided with resources during runtime for dedicated usage. Examples of the CF and VF may include the physical function and virtual functions under schemes such as Single Root I/O Virtualization or Multi-Root I/O Virtualization architecture. The CF acts as the physical resources that sets up and manages virtual resources. The CF is also capable of acting as a full-fledged IO device. The VF is responsible for providing an abstraction of a virtual device for communication with multiple logical entities/multiple memory regions.

The operating system/the hypervisor/any of the virtual machines/user code running on a host processor module 606*c* may be loaded with a device model, a VF driver and a driver for a CF. The device model may be used to create an emulation of a physical device for the host processor 606*c* to recognize each of the multiple VFs that are created. The device model may be replicated multiple times to give the impression to a VF driver (a driver that interacts with a virtual IO device) that it is interacting with a physical device of a particular type.

For example, a certain device module may be used to emulate a network adapter such as the Intel® Ethernet Converged Network Adapter (CNA) X540-T2, so that the I/O device 602 believes it is interacting with such an adapter. In such a case, each of the virtual functions may have the capability to support the functions of the above said CNA, i.e., each of the Physical Functions should be able to support such functionality. The device model and the VF driver can be run in either privileged or non-privileged modes. In some embodiments, there is no restriction with regard to who hosts/ runs the code corresponding to the device model and the VF driver. The code, however, has the capability to create multiple copies of device model and VF driver so as to enable multiple copies of said I/O interface to be created.

An application or provisioning agent 606*d*, as part of an application/user level code running in a kernel, may create a virtual I/O address space for each VF during runtime and allocate part of the physical address space to it. For example, if an application handling the VF driver instructs it to read or write packets from or to memory addresses 0xaaaa to 0xffff, the device driver may write I/O descriptors into a descriptor queue with a head and tail pointer that are changed dynamically as queue entries are filled. The data structure may be of another type as well, including but not limited to a ring structure 602*a* or hash table.

The VF can read from or write data to the address location pointed to by the driver (and hence to a computational unit 600). Further, on completing the transfer of data to the address space allocated to the driver, interrupts, which are usually triggered to the host processor to handle said network packets, can be disabled. Allocating a specific I/O space to a device can include allocating said IO space a specific physical memory space occupied.

In another embodiment, the descriptor may comprise only a write operation, if the descriptor is associated with a specific data structure for handling incoming packets. Further, the descriptor for each of the entries in the incoming data structure may be constant so as to redirect all data write to a specific memory location. In an alternate embodiment, the descriptor for consecutive entries may point to consecutive entries in memory so as to direct incoming packets to consecutive memory locations.

Alternatively, said operating system may create a defined physical address space for an application supporting the VF drivers and allocate a virtual memory address space to the application or provisioning agent 606*d*, thereby creating a mapping for each virtual function between said virtual address and a physical address space. Said mapping between virtual memory address space and physical memory space may be stored in IOMMU tables 604*a*. The application performing memory reads or writes may supply virtual addresses to say virtual function, and the host processor OS may allocate a specific part of the physical memory location to such an application.

Alternatively, VF may be configured to generate requests such as read and write which may be part of a direct memory access (DMA) read or write operation, for example. The virtual addresses is be translated by the IOMMU 604*b* to their corresponding physical addresses and the physical addresses may be provided to the memory controller for access. That is, the IOMMU 604*b* may modify the memory requests sourced by the I/O devices to change the virtual address in the request to a physical address, and the memory request may be forwarded to the memory controller for memory access. The memory request may be forwarded over a bus 614. The VF may in such cases carry out a direct memory access by supplying the virtual memory address to the IOMMU 604*b*.

Alternatively, said application may directly code the physical address into the VF descriptors if the VF allows for it. If the VF cannot support physical addresses of the form used by the host processor 606*c*, an aperture with a hardware size supported by the VF device may be coded into the descriptor so that the VF is informed of the target hardware address of the device. Data that is transferred to an aperture may be mapped by a translation table to a defined physical address space in the system memory. The DMA operations may be initiated by software executed by the processors, programming the I/O devices directly or indirectly to perform the DMA operations.

Referring still to FIG. 6-1, in particular embodiments, parts of computational unit 600 can be implemented with one or more FPGAs. In the system of FIG. 6-1, computational unit 600 can include FPGA 610 in which can be formed a DMA slave device module 610*a* and arbiter 610*f*. A DMA slave module 610*a* can be any device suitable for attachment to a memory bus 616 that can respond to DMA read/write requests. In alternate embodiments, a DMA slave module 610*a* can be another interface capable of block data transfers over memory bus 616. The DMA slave module 610*a* can be capable of receiving data from a DMA controller (when it performs a read from a 'memory' or from a peripheral) or transferring data to a DMA controller (when it performs a write instruction on the DMA slave module 610*a*). The DMA slave module 610*a* may be adapted to receive DMA read and write instructions encapsulated over a memory bus, (e.g., in the form of a DDR data transmission, such as a packet or data burst), or any other format that can be sent over the corresponding memory bus.

A DMA slave module 610*a* can reconstruct the DMA read/write instruction from the memory R/W packet. The DMA slave module 610*a* may be adapted to respond to these instructions in the form of data reads/data writes to a DMA master, which could either be housed in a peripheral device, in the case of a PCIe bus, or a system DMA controller in the case of an ISA bus.

I/O data that is received by the DMA device 610*a* can then be queued for arbitration. Arbitration is the process of scheduling packets of different flows, such that they are provided access to available bandwidth based on a number of parameters. In general, an arbiter provides resource access to one or more requestors. If multiple requestors request access, an arbiter 610*f* can determine which requestor becomes the accessor and then passes data from the accessor to the resource interface, and the downstream resource can begin execution on the data. After the data has been completely transferred to a resource, and the resource has competed execution, the arbiter 610*f* can transfer control to a different requestor and this cycle repeats for all available requestors. In the embodiment of FIG. 6-1, arbiter 610*f* can notify other portions of computational unit 600 (e.g., 608) of incoming data.

Alternatively, a computation unit 600 can utilize an arbitration scheme shown in U.S. Pat. No. 7,863,283, issued to Dalal on Oct. 62, 2010, the contents of which are incorporated herein by reference. Other suitable arbitration schemes known in art could be implemented in embodiments herein. Alternatively, the arbitration scheme for an embodiment can be an OpenFlow switch and an OpenFlow controller.

In the very particular embodiment of FIG. 6-1, computational unit 600 can further include notify/prefetch circuits 610*c* which can prefetch data stored in a buffer memory 610*b* in response to DMA slave module 610*a*, and as arbitrated by arbiter 610*f*. Further, arbiter 610*f* can access other portions of the computational unit 600 via a memory mapped I/O ingress path 610*e* and egress path 610*g*.

Referring to FIG. 6-1, a hardware scheduler can include a scheduling circuit 608*b/n* to implement traffic management of incoming packets. Packets from a certain source, relating to a certain traffic class, pertaining to a specific application or flowing to a certain socket are referred to as part of a session flow and are classified using session metadata. Such classification can be performed by classifier 608*e*.

In some embodiments, session metadata 608d can serve as the criterion by which packets are prioritized and scheduled and as such, incoming packets can be reordered based on their session metadata. This reordering of packets can occur in one or more buffers and can modify the traffic shape of these flows. The scheduling discipline chosen for this prioritization, or traffic management (TM), can affect the traffic shape of flows and micro-flows through delay (buffering), bursting of traffic (buffering and bursting), smoothing of traffic (buffering and rate-limiting flows), dropping traffic (choosing data to discard so as to avoid exhausting the buffer), delay jitter (temporally shifting cells of a flow by different amounts) and by not admitting a connection (e.g., cannot simultaneously guarantee existing service (SLAs) with an additional flow's SLA).

According to embodiments, computational unit 600 can serve as part of a switch fabric, and provide traffic management with depth-limited output queues, the access to which is arbitrated by a scheduling circuit 608b/n. Such output queues are managed using a scheduling discipline to provide traffic management for incoming flows. The session flows queued in each of these queues can be sent out through an output port to a downstream network element.

It is noted that some conventional traffic management circuits do not take into account the handling and management of data by downstream elements except for meeting the SLA agreements it already has with said downstream elements. In contrast, according to embodiments, a scheduler circuit 608b/n can allocate a priority to each of the output queues and carry out reordering of incoming packets to maintain persistence of session flows in these queues. A scheduler circuit 608b/n can be used to control the scheduling of each of these persistent sessions into a general purpose operating system (OS) 608j, executed on an offload processor 608i. Packets of a particular session flow, as defined above, can belong to a particular queue. The scheduler circuit 608b/n may control the prioritization of these queues such that they are arbitrated for handling by a general purpose (GP) processing resource (e.g., offload processor 608i) located downstream. An OS 608j running on a downstream processor 608i can allocate execution resources such as processor cycles and memory to a particular queue it is currently handling. The OS 608j may further allocate a thread or a group of threads for that particular queue, so that it is handled distinctly by the general purpose processing element 608i as a separate entity. Thus, in some embodiments there can be multiple sessions running on a GP processing resource, each handling data from a particular session flow resident in a queue established by the scheduler circuit, to tightly integrate the scheduler and the downstream resource (e.g., 608i). This can bring about persistence of session information across the traffic management and scheduling circuit and the general purpose processing resource 608j.

Dedicated computing resources (e.g., 608i), memory space and session context information for each of the sessions can provide a way of handling, processing and/or terminating each of the session flows at the general purpose processor 608i. The scheduler circuit 608b/n can exploit this functionality of the execution resource to queue session flows for scheduling downstream. For example, the scheduler circuit 608b/n can be informed of the state of the execution resource(s) (e.g., 608i), the current session that is run on the execution resource; the memory space allocated to it, the location of the session context in the processor cache.

According to embodiments, a scheduler circuit 608b/n can further include switching circuits to change execution resources from one state to another. The scheduler circuit 608b/n can use such a capability to arbitrate between the queues that are ready to be switched into the downstream execution resource. Further, the downstream execution resource can be optimized to reduce the penalty and overhead associated with context switch between resources. This is further exploited by the scheduler circuit 608b/n to carry out seamless switching between queues, and consequently their execution as different sessions by the execution resource.

A scheduler circuit 608b/n according to embodiments can schedule different sessions on a downstream processing resource, wherein the two are operated in coordination to reduce the overhead during context switches. An important factor to decreasing the latency of services and engineering computational availability can be hardware context switching synchronized with network queuing. In embodiments, when a queue is selected by a traffic manager, a pipeline coordinates swapping in of the cache (e.g., L2 cache) of the corresponding resource and transfers the reassembled I/O data into the memory space of the executing process. In certain cases, no packets are pending in the queue, but computation is still pending to service previous packets. Once this process makes a memory reference outside of the data swapped, the scheduler circuit can enable queued data from an I/O device 602 to continue scheduling the thread.

In some embodiments, to provide fair queuing to a process not having data, a maximum context size can be assumed as data processed. In this way, a queue can be provisioned as the greater of computational resource and network bandwidth resource. As but one very particular example, a computation resource can be an ARM A9 processor running at 800 MHz, while a network bandwidth can be 3 Gbps of bandwidth. Given the lopsided nature of this ratio, embodiments can utilize computation having many parallel sessions (such that the hardware's prefetching of session-specific data offloads a large portion of the host processor load) and having minimal general purpose processing of data.

Accordingly, in some embodiments, a scheduler circuit 608b/n can be conceptualized as arbitrating, not between outgoing queues at line rate speeds, but arbitrating between terminated sessions at very high speeds. The stickiness of sessions across a pipeline of stages, including a general purpose OS, can be a scheduler circuit optimizing any or all such stages of such a pipeline.

Alternatively, a scheduling scheme can be used as shown in U.S. Pat. No. 7,760,765 issued to Dalal on Jul. 20, 2010, incorporated herein by reference. This scheme can be useful when it is desirable to rate limit the flows for preventing the downstream congestion of another resource specific to the over-selected flow, or for enforcing service contracts for particular flows. Embodiments can include arbitration scheme that allows for service contracts of downstream resources, such as general purpose OS that can be enforced seamlessly.

Referring still to FIG. 6-1, a hardware scheduler according to embodiments herein, or equivalents, can provide for the classification of incoming packet data into session flows based on session metadata. It can further provide for traffic management of these flows before they are arbitrated and queued as distinct processing entities on the offload processors.

In some embodiments, offload processors (e.g., 608i) can be general purpose processing units capable of handling packets of different application or transport sessions. Such offload processors can be low power processors capable of executing general purpose instructions. The offload processors could be any suitable processor, including but not limited to: ARM, ARC, Tensilica, MIPS, StrongARM or any other processor that serves the functions described herein. The offload processors have general purpose OS running on them, wherein the general purpose OS is optimized to reduce the penalty associated with context switching between different threads or group of threads.

In contrast, context switches on host processors can be computationally intensive processes that require the register save area, process context in the cache and TLB entries to be restored if they are invalidated or overwritten. Instruction Cache misses in host processing systems can lead to pipeline stalls and data cache misses lead to operation stall and such cache misses reduce processor efficiency and increase processor overhead.

According to embodiments, an OS 608j running on the offload processors 608i in association with a scheduler circuit, can operate together to reduce the context switch overhead incurred between different processing entities running on it. Embodiments can include a cooperative mechanism between a scheduler circuit and the OS on the offload processor 608i, wherein the OS sets up session context to be physically contiguous (physically colored allocator for session heap and stack) in the cache; then communicates the session color, size, and starting physical address to the scheduler circuit upon session initialization. During an actual context switch, a scheduler circuit can identify the session context in the cache by using these parameters and initiate a bulk transfer of these contents to an external low latency memory. In addition, the scheduler circuit can manage the prefetch of the old session if its context was saved to a local memory 608m. In particular embodiments, a local memory 608m can be low latency memory, such as a reduced latency dynamic random access memory (RLDRAM), as but one very particular embodiment. Thus, in embodiments, session context can be identified distinctly in the cache.

In some embodiments, context size can be limited to ensure fast switching speeds. In addition or alternatively, embodiments can include a bulk transfer mechanism to transfer out session context to a local memory 608m. The cache contents stored therein can then be retrieved and prefetched during context switch back to a previous session. Different context session data can be tagged and/or identified within the local memory 608m for fast retrieval. As noted above, context stored by one offload processor may be recalled by a different offload processor.

In the very particular embodiment of FIG. 6-1 multiple offload processing cores can be integrated into a computation FPGA 608. Multiple computational FPGAs can be arbitrated by arbitrator circuits in another FPGA 610. The combination of computational FPGAs (e.g., 608) and arbiter FPGAs (e.g., 610) can be one implementation of a XIMM module. In particular applications, these XIMM modules can provide integrated traffic and thread management circuits that broker execution of multiple sessions on the offload processors.

FIG. 6-2 shows a system flow according to an embodiment. Packet or other I/O data can be received at an I/O device 620. An I/O device 620 can be physical device, virtual device or combination thereof. Interrupts generated from the I/O data, that would conventionally be intended for a host processor 624, can be disabled, allowing such I/O data to be processed without resources of the host processor 624.

An IOMMU 621 can map received data to physical addresses of a system address space. DMA master 625 can transmit such data to such memory addresses by operation of a memory controller 622. Memory controller 622 can execute DRAM transfers over a memory bus with a DMA Slave 627. Upon receiving transferred I/O data, a hardware scheduler 623 can schedule processing of such data with an offload processor 624. In some embodiments, a type of processing can be indicated by metadata within the I/O data. Further, in some embodiments such data can be stored in an Onboard Memory 629. According to instructions from hardware scheduler 629, one or more offload processors 624 can execute computing functions in response to the I/O data. In some embodiments, such computing functions can operate on the I/O data, and such data can be subsequently read out on memory bus via a read request processed by DMA Slave 627.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A packet handling system, comprising:
at least one main processor coupled to a system bus and to a memory bus by a memory controller,
a plurality of offload processors disposed on hardware modules directly connected to a memory bus and configured to provide security related services on packets received over the memory bus by operation of the memory controller prior to redirection to the main processor;
an arbiter disposed on at least one of the hardware modules and connected to each of the plurality of offload processors of its hardware module, the arbiter configured to schedule resource priority for instructions or data received from the memory bus by operation of the memory controller;
a first virtual switch disposed on at least one of the hardware modules in communication with both the main processor and the plurality of offload processors by operation of the memory controller using the memory bus, with the first virtual switch configured to receive memory read/write data over the memory bus, and further directing at least some memory read/write data to the arbiter; and
a second virtual switch coupled to the system bus and configured to receive the packets and direct the packets to at least the first virtual switch by operation of the memory controller.

2. The packet handling system of claim 1, wherein the offload processors are configured to provide support for signature detection by an intrusion prevention system as the security related services.

3. The packet handling system of claim 1, wherein the offload processors are configured to provide support for encryption/decryption as the security related services.

4. The packet handling system of claim 1, wherein the second virtual switch comprises a network interface card coupled to the system bus, with packets being passed to the first virtual switch by the second virtual switch and an input-out memory management unit (IOMMU).

5. The packet handling system of claim 1, wherein the offload processors are connected to module memory disposed on their respective hardware module, and further include a snoop control unit for coherent read out and write in to the module memory.

6. The packet handling system of claim 1, wherein the offload processors are connected to module memory disposed on their respective module and configured to permit zero-overhead context switching between threads of a networked application.

7. The packet handling system of claim 1, wherein the offload processors are connected to module memory and a computational FPGA, all being mounted together on an in-line hardware module configured for insertion into a dual in-line memory (DIMM) socket.

8. The packet handling system of claim 4, wherein the network interface card includes single root IO virtualization (SR-IOV).

* * * * *